United States Patent
Yoshikawa

(10) Patent No.: US 8,538,726 B2
(45) Date of Patent: Sep. 17, 2013

(54) THREE DIMENSIONAL SHAPE MEASUREMENT APPARATUS, THREE DIMENSIONAL SHAPE MEASUREMENT METHOD, AND COMPUTER PROGRAM

(75) Inventor: Hiroshi Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 12/780,549

(22) Filed: May 14, 2010

(65) Prior Publication Data

US 2010/0299103 A1    Nov. 25, 2010

(30) Foreign Application Priority Data

May 21, 2009 (JP) ................................ 2009-123536

(51) Int. Cl.
*G01F 15/00* (2006.01)
(52) U.S. Cl.
USPC ............. 702/167; 382/154; 348/47; 356/603; 356/604
(58) Field of Classification Search
USPC ................. 702/167; 340/612; 382/154, 286; 348/47, 50, E13.07, E13.001; 356/601, 603, 356/604, 605, 602, 610, 611, 612, 613
See application file for complete search history.

(56) References Cited

U.S. PATENT DOCUMENTS

| | | | |
|---|---|---|---|
| 5,262,820 A * | 11/1993 | Tamai et al. ..................... 396/54 |
| 5,698,841 A * | 12/1997 | Momoki ..................... 250/201.2 |
| 6,229,913 B1 | 5/2001 | Nayar et al. |
| 7,545,516 B2 * | 6/2009 | Jia et al. ......................... 356/603 |
| 2003/0002052 A1* | 1/2003 | Hoffmann ..................... 356/603 |
| 2003/0016366 A1* | 1/2003 | Takeda et al. ................. 356/604 |
| 2004/0021936 A1* | 2/2004 | Czarnetzki et al. ........... 359/368 |
| 2007/0115484 A1* | 5/2007 | Huang et al. .................. 356/604 |
| 2007/0206204 A1* | 9/2007 | Jia et al. ......................... 356/604 |
| 2007/0229850 A1* | 10/2007 | Herber ........................... 356/604 |

FOREIGN PATENT DOCUMENTS

| | | |
|---|---|---|
| JP | 3481631 | 12/2003 |
| JP | 2009168789 A * | 7/2009 |
| WO | 96/41301 | 12/1996 |

OTHER PUBLICATIONS

"Fourier Transform Profilometry for the Automatic Measurement of 3-D Object Shapes", Mitsuo Takeda and Kazuhiro Mutoh, Dec. 15, 1983, vol. 22, No. 24, pp. 3977-3982.
"Projection Defocus analysis for Scene Capture and Image Display", Li Zhang and Shree Nayar. ACM Trans. On Graphics, vol. 25, 3, pp. 907-915, Jul. 2006.
Masahito Tonooka, et al., Surface Profile Measurement by Phase and Contrast Detection using Grating Projection Method, Journal of the Japanese Society for Precision Engineering, Jan. 2003, vol. 66, No. 1, pp. 132-136 (Translation of Abstract only).
The above references were cited in a Jul. 1, 2013 Japanese Office Action, a copy of which is enclosed without an English Translation, that issued in Japanese Patent Application No. 2009-123536.

* cited by examiner

*Primary Examiner* — Carol S Tsai
(74) *Attorney, Agent, or Firm* — Cowan, Liebowitz & Latman, P.C.

(57) ABSTRACT

A 3D shape measurement apparatus for measuring a 3D shape of an object existing on a measurement area, comprising, a pattern projection unit for projecting a pattern having a periodicity onto the measurement area, and a capturing unit for capturing an image of the area where the pattern is projected, wherein the measurement area is specified by a reference plane, a projection area of the pattern projection unit, and a capturing area of the capturing unit, and the pattern projection unit projects the pattern to be focused on the reference plane. The apparatus further comprises a first calculation unit for calculating phase information of a pattern of the captured image, a second calculation unit for calculating defocus amounts of the pattern in the captured image, and a third calculation unit for calculating a 3D shape of the object based on the phase information and the defocus amounts.

9 Claims, 19 Drawing Sheets

F I G. 16A
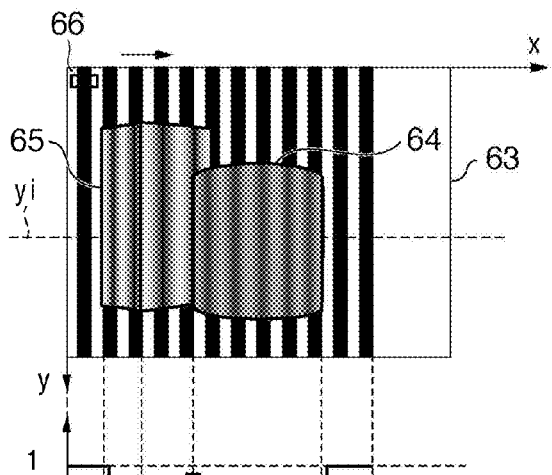
F I G. 16B
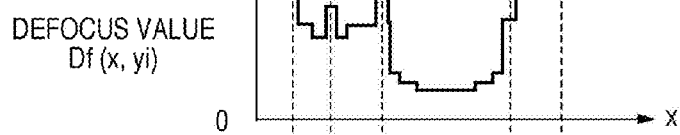
F I G. 16C
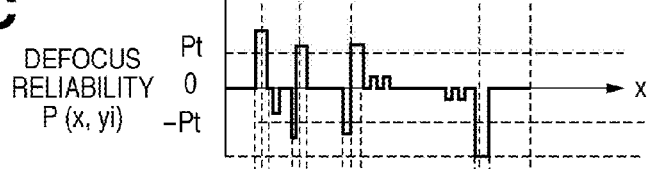
F I G. 16D
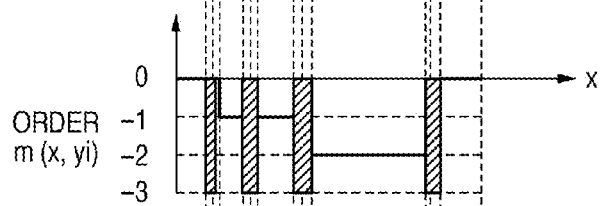
F I G. 16E
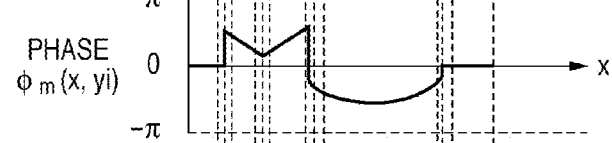
F I G. 16F
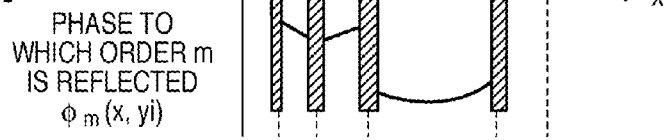

PHASE BEFORE UNWRAPPING
$\phi_w(x, yi)$

DERIVATIVE VALUE OF PHASE
BEFORE UNWRAPPING
$d\phi_w(x, yi)/dx$

PHASE TO WHICH
ORDER m IS REFLECTED
$\phi_m(x, yi)$

CORRECTION
DIRECTION

CORRECTED PHASE
$\phi(x, yi)$

SHAPE INFORMATION
$Z(x, yi)$

F I G. 18
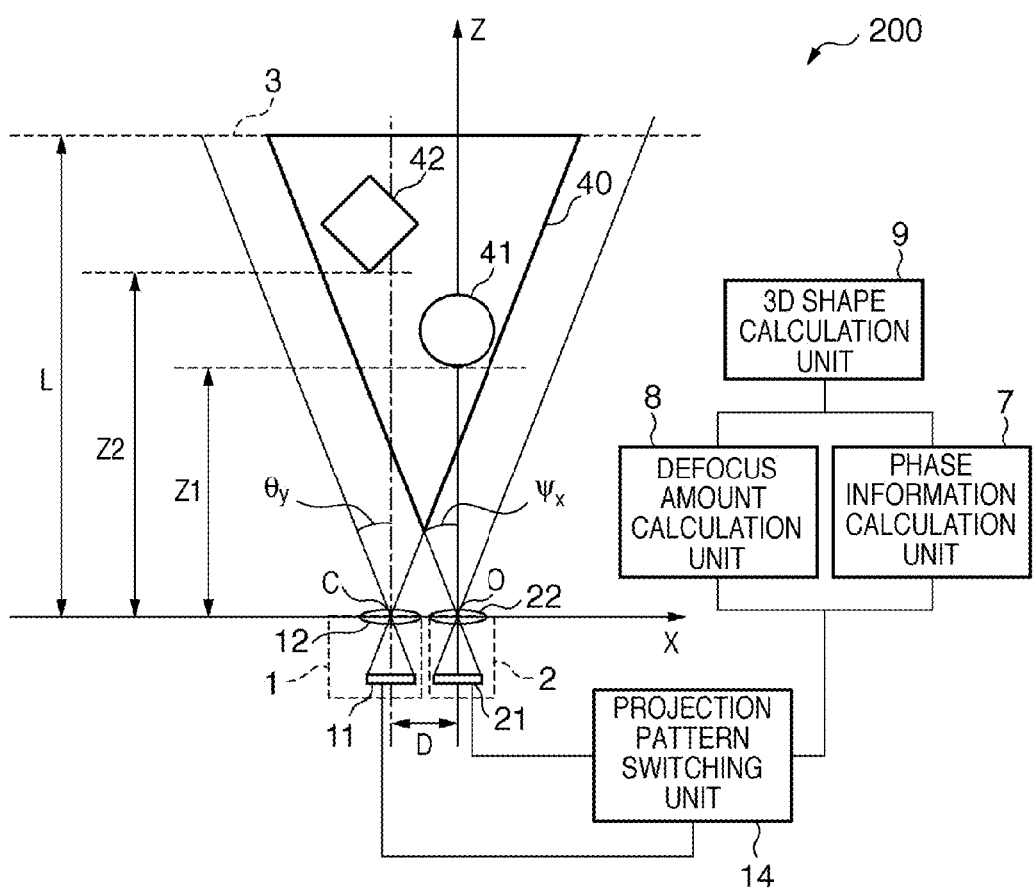

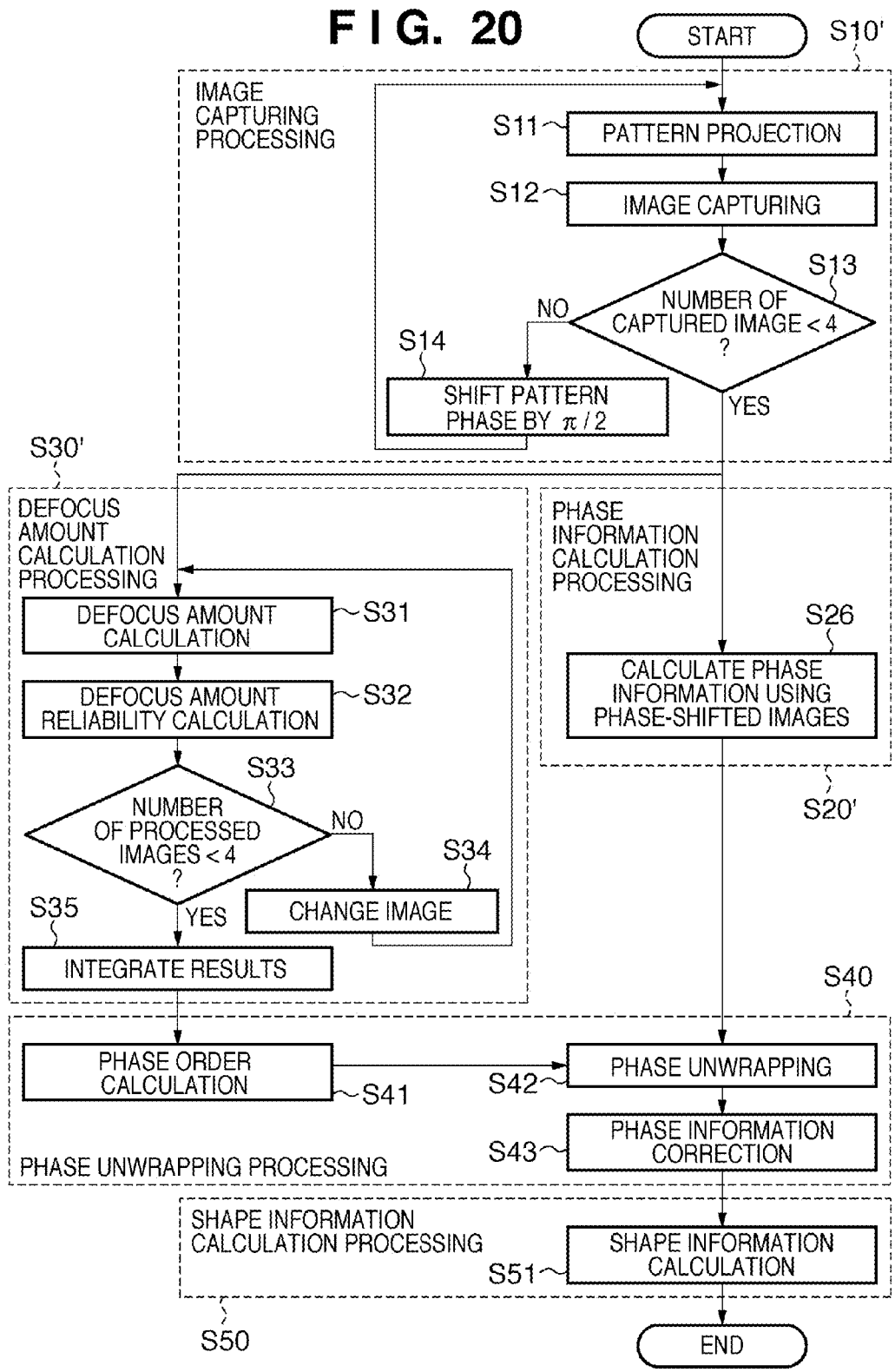

THREE DIMENSIONAL SHAPE MEASUREMENT APPARATUS, THREE DIMENSIONAL SHAPE MEASUREMENT METHOD, AND COMPUTER PROGRAM

BACKGROUND OF THE INVENTION

1. Field of the Invention

The present invention relates to a three dimensional shape measurement apparatus, three dimensional shape measurement method, and computer program.

2. Description of the Related Art

Various three dimensional (3D) shape measurement methods have been proposed. Upon roughly classifying these methods, they include a passive type, which performs a shape measurement using only a capturing device without using any illumination device, and an active type, which uses an illumination device and capturing device in combination. The active type assures higher robustness against an object than the passive type, and can attain a high-precision distance measurement. Even when surface texture information of an object is small, the active type is hardly influenced by the surface texture information since it attains a shape measurement based on a projected illumination pattern. Typical examples of the active type include a method based on triangulation, a method based on phase information variations, and a method based on defocus information of a projected pattern.

Of these methods, the method using phase information variations of a pattern is called a fringe pattern projection method, and as one of typical methods, a Fourier transformation method is available (see M. Takeda and K. Mutoh, "Fourier transform profilometry for automatic measurement of 3-D object shapes," Appl. Opt. Vol. 22, No. 24, p. 3977-3982 (1983)). However, with this method, since phase variations that can be measured are limited to those within a specific area, when a shape change outside the area takes place, phases are aliased, thus requiring phase unwrapping. Hence, it is relatively easy for an object having a smooth shape to attain phase unwrapping using phase continuity. However, it becomes difficult to attain phase unwrapping in case of an object having an abrupt shape change or discontinuous objects.

As the method based on defocus information of a projected pattern, a shape measurement method using a defocus caused by a capturing optical system (see Japanese Patent No. 3481631) and a shape measurement method using a defocus caused by a projection optical system (see Li Zhang and Shree Nayar, "Projection defocus analysis for scene capture and image display," ACM Trans. on Graphics, Vol. 25, 3, P. 907-915 (July 2006)) are available. In the latter method, when a capturing optical system is a pan-focus system, a blur becomes larger in proportion to defocus amounts from a focal point position of a projection optical system. This blur is evaluated as a spread of a pattern on an image, and its shape is measured. More specifically, 24 different patterns obtained by finely shifting a rectangular projection pattern are projected and their images are captured. Defocus amounts are calculated based on luminance value variations by time-serially arranging luminance values of respective pixels of images for respective patterns. This method is not suitable for a real-time measurement since many patterns have to be projected, although depth absolute values can be calculated.

SUMMARY OF THE INVENTION

As described above, a 3D shape measurement technology which can measure an object having an abrupt shape change and discontinuous objects up to a detailed shape using a small number of projected patterns has never been proposed. Hence, the present invention allows a high-precision shape measurement of an object having an abrupt shape change and discontinuous objects to be attained.

One aspect of embodiments of the present invention relates to a three dimensional shape measurement apparatus for measuring a 3D shape of an object existing on a measurement area, comprising, a pattern projection unit configured to project a pattern having a periodicity onto the measurement area, and a capturing unit configured to capture an image of the area onto which the pattern is projected, wherein the measurement area is specified by a reference plane, a projection area of the pattern projection unit, and a capturing area of the capturing unit, and the pattern projection unit projects the pattern to be focused on the reference plane. The three dimensional shape measurement apparatus further comprises a phase information calculation unit configured to calculate phase information of a pattern of an image captured by the capturing unit when the object exists on the measurement area, a defocus amount calculation unit configured to calculate defocus amounts of the pattern in the captured image, and a three dimensional shape calculation unit configured to calculate a three dimensional shape of the object based on the phase information and the defocus amounts.

Further features of the present invention will become apparent from the following description of exemplary embodiments with reference to the attached drawings.

BRIEF DESCRIPTION OF THE DRAWINGS

FIGS. 16A to 16F are views for explaining the calculation processes of phase information $\phi(x, y)$;

FIG. 18 is a view showing an example of the arrangement of a 3D shape measurement apparatus 200 according to the second embodiment;

FIG. 20 is a flowchart showing an example of 3D shape measurement processing according to the second embodiment.

DESCRIPTION OF THE EMBODIMENTS

Figure 1:
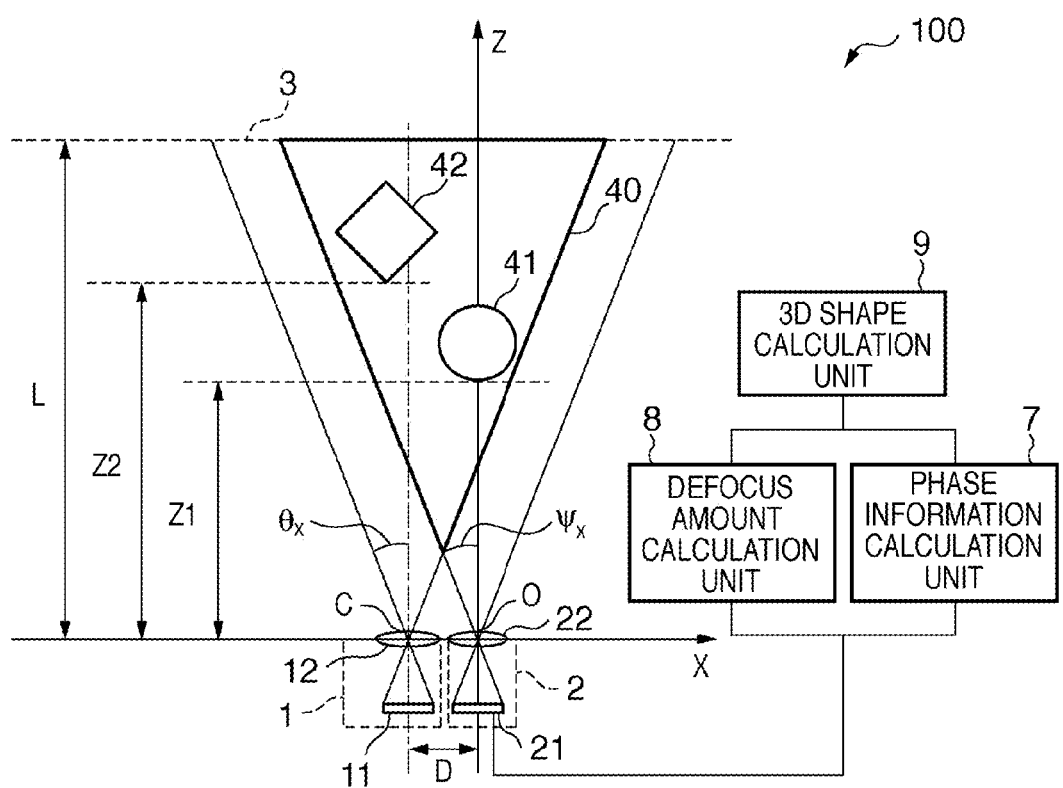
FIG. 1 is a view showing an example of the arrangement of a 3D shape measurement apparatus 100 according to the first embodiment.

Preferred embodiments of the present invention will be described hereinafter with reference to the accompanying drawings. Note that the same reference numerals denote the same components throughout the drawings, and a repetitive description thereof will be avoided.

First Embodiment

FIG. 1 is a schematic plan view of a shape measurement apparatus 100 according to the first embodiment of the present invention. An optical center O of a capturing unit 2 is laid out to be an origin of a world coordinate system (X, Y, Z). A Z-axis agrees with the optical axis of the capturing unit 2 to specify an X-axis in a horizontal rightward direction, and a Y-axis in a vertical downward direction. In the first embodiment, the optical axes of a pattern projection unit 1 and the capturing unit 2 are laid out to be parallel to each other. An optical center C of the pattern projection unit 1 is laid out at a position separated by a distance D on the X-axis from the optical center O of the capturing unit 2. A horizontal half field angle of the pattern projection unit 1 is represented by $\theta_x$, and a vertical half field angle is represented by $\theta_y$. Also, a horizontal half field angle of the capturing unit 2 is represented by $\Psi_x$, and a vertical half field angle is represented by $\Psi_y$. In FIG. 1, objects are a circular cylinder 41 which is located at a position separated by a distance Z1 from the optical center O of the capturing unit 2, and a rectangular column 42 which is located at a position separated by a distance Z2 from the optical center O of the capturing unit.

The pattern projection unit 1 includes an image display element 11 and projection optical system 12. As the pattern projection unit 1, a projection device such as a liquid crystal projector, which can form a pattern having a periodicity at a specific position, is used. A focal point of the pattern projection unit 1 is set on a reference plane 3 of a scene. A distance from the optical center C of the pattern projection unit 1 to the reference plane 3 is L. The reference plane 3 is desirably set at a most behind position of a measurement area. This is because when objects are located at both positions in front of and behind the reference plane, whether a blur of a projected pattern is generated since the projected pattern is located in front of or behind an in-focus position cannot be determined. The measurement area whose depth can be measured is specified by an area 40 where three areas, in other words, a projection area of the pattern projection unit 1, a capturing area of the capturing unit 2, and an area on the capturing unit side of the reference plane overlap, and which is indicated by bold solid lines. However, portions occluded behind the objects cannot be measured even when they are located within the area.

Figure 2A:
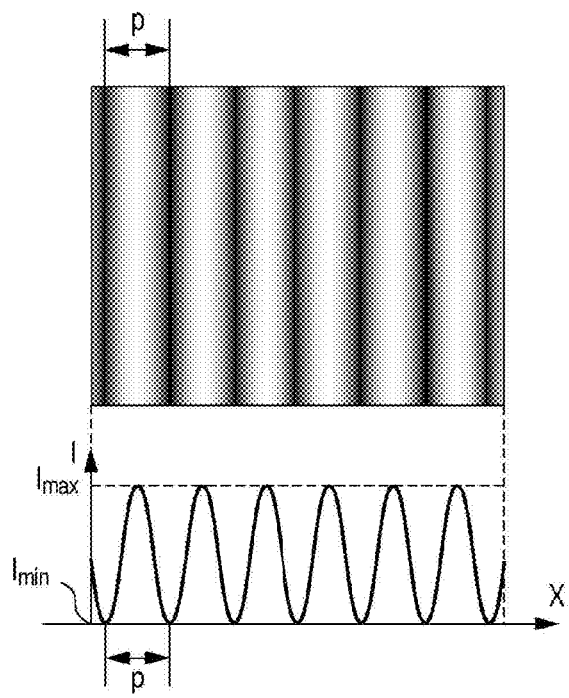
FIGS. 2A and 2B are views showing projected patter examples of a pattern projection unit 1 of the first embodiment.
Figure 2B:
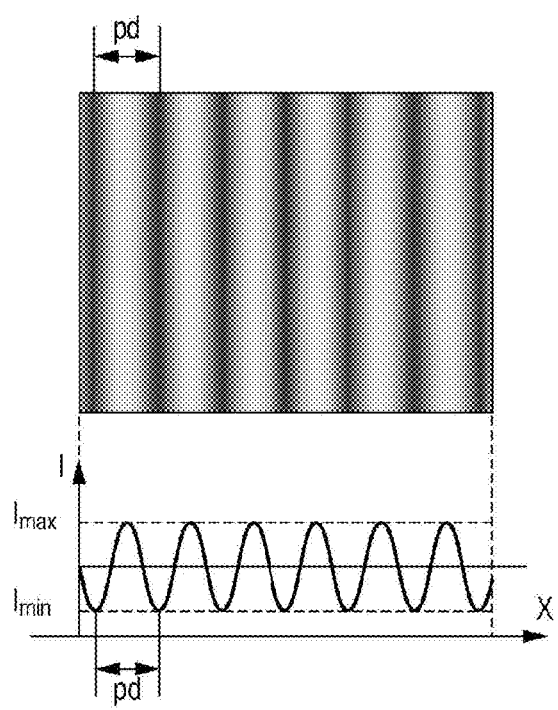

FIGS. 2A and 2B show examples of patterns projected by the pattern projection unit 1. As shown in FIG. 2A, a projection pattern is that having a periodicity in which an illumination intensity varies sinusoidally between a maximum intensity $I_{max}$ and minimum intensity $I_{min}$. The first embodiment will explain a case in which the pattern projection unit 1 projects a pattern of one type. The pattern is adjusted to have a pitch p on the reference plane 3. An example of a sinusoidal pattern at a position deviated from the reference plane 3 is as shown in FIG. 2B. A defocus is generated due to the influence of a positional deviation from the reference plane 3 as the focal point position of the projection optical system. For this reason, the maximum intensity $I_{max}$ decreases, and the minimum intensity $I_{min}$ increases. That is, a contrast C, which is described by:

$$C = (I_{max} - I_{min})/(I_{max} + I_{min}) \quad (1)$$

lowers.

Since the projected pattern comes closer to gray with increasing defocus generation amount, the standard deviation of image luminance values decreases. A standard deviation SD is described by:

$$SD^2 = \frac{1}{N} \sum_{i=0}^{N} (I_i - I_{ave}) \quad (2)$$

where N is the total number of pixels in a certain image region, $I_{ave}$ is an average value of image luminance values in the certain image region, and $I_i$ is a luminance value of each pixel in the image region.

Referring back to FIG. 1, the capturing unit 2 includes a capturing element 21 and capturing lens 22. As the capturing element 21, a photoelectric conversion element such as a CMOS sensor or CCD can be used. Let Fc be a focal length of the capturing lens 22. Assume that various camera parameters such as a distortion are calibrated in advance. In order to isolate a defocus caused by the projection optical system of the pattern projection unit 1 from that caused by a capturing optical system of the capturing unit 2, an image is required to be captured under a condition that the defocus of the capturing optical system can be ignored. More specifically, an aperture of the capturing unit 2 is required to be sufficiently stopped down to set a large depth of field. However, it should be noted that when the aperture is excessively stopped down, an image is unwantedly blurred due to the influence of diffraction.

A near depth of field and far depth of field of the capturing unit 2 are respectively calculated by:

$$\phi_r \times Fno \times Z_s^2 / (Fc^2 + \phi_r \times Fno \times Z_s) \quad (3)$$

$$\phi_r \times Fno \times Z_s^2 / (Fc^2 - \phi_r \times Fno \times Z_s) \quad (4)$$

where $\phi_r$ is a radius of a permissible circle of confusion, Fno is an f-number (aperture value), $Z_s$ is an object distance, and Fc is the focal length of the capturing optical system. The sum of the near and far depths of field is a depth of field of the capturing optical system.

A case will be examined below wherein, for example, an image of a scene which is separated by 1 m and has a depth area of 30 cm is to be captured using a camera including a ½-inch VGA capturing element and a lens having a focal length of 16 mm. If the pixel pitch of the capturing element is 0.01 mm, an f-number=4 or more has to be set. On the other hand, a blur limit due to diffraction is calculated by an Airy formula:

$$1.22 \times \lambda \times Fno \quad (5)$$

where λ is the wavelength of light. Upon calculating formula (5) using 780 nm as the longest wavelength in visible light, if the pixel pitch of the capturing element is 0.01 mm, the influence of diffraction is removed if the f-number is set to be smaller than F11. That is, in the above condition, the f-number has to be set to fall within a range between F4 and F8.

Figure 3:
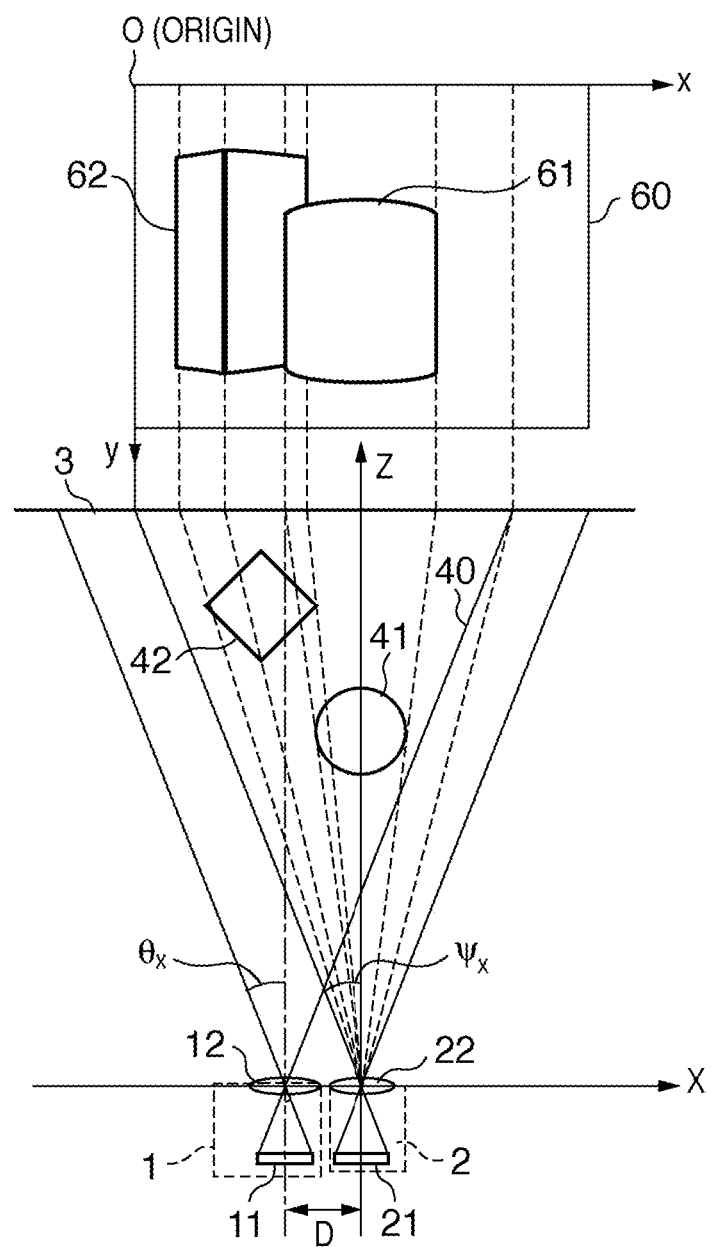
FIG. 3 is a view showing an example in which an image of a scene is captured without displaying any pattern on the pattern projection unit 1.

When an image of the scene including the circular cylinder 41 and rectangular column 42 is captured without displaying any pattern on the pattern projection unit 1, a captured image 60 shown in FIG. 3 is obtained. The image 60 includes a circular cylinder 61 and rectangular column 62. An x-axis of an image coordinate system is defined in the right direction toward the reference plane 3, and a y-axis is similarly defined in the lower direction. Also, assume that an origin o of the image coordinate system is set at an upper left position.

Figure 4:
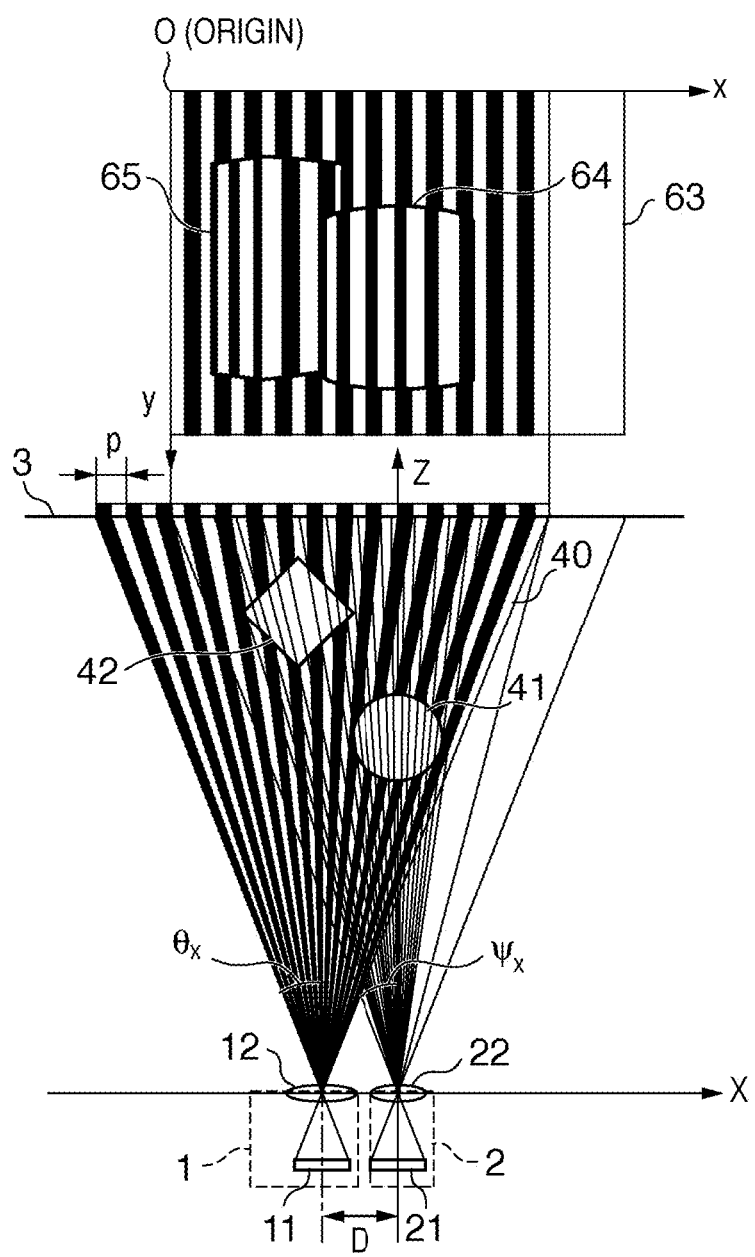
FIG. 4 is a view showing an example of a captured image when a pattern is projected in the situation shown in FIG. 3.

When the pattern shown in FIG. 2A is projected by the pattern projection unit 1, an image 63 shown in FIG. 4 is obtained. The image 63 includes a circular cylinder 64 and rectangular column 65. However, FIG. 4 does not take a defocus caused by the optical system of the pattern projection unit 1 into consideration. Also, sinusoidal intensity variations are simply expressed by binary values. In practice, due to a defocus of the projection optical system, the contrast of the pattern lowers.

Figure 5A:
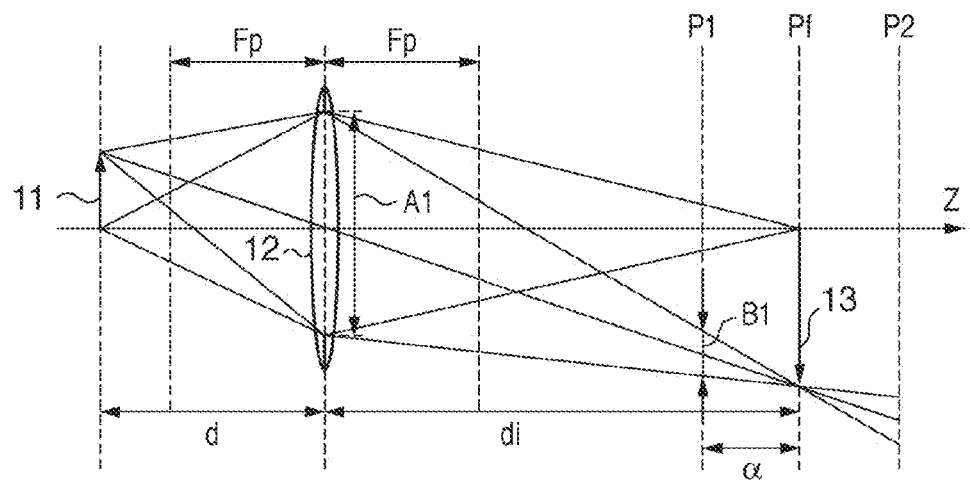
FIGS. 5A and 5B are views for explaining defocus amounts of projected patterns.
Figure 5B:
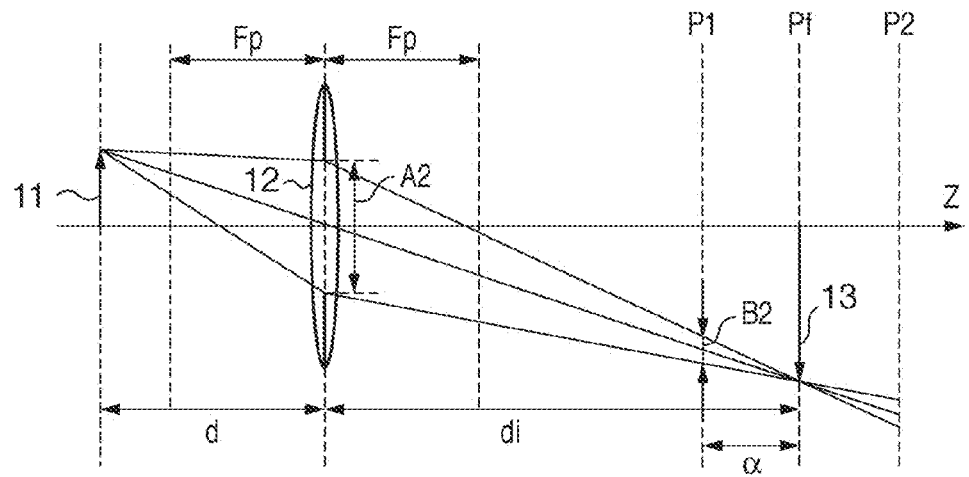

Note that defocus amounts of a projected pattern, which is projected by the pattern projection unit 1, depend on positional deviation amounts from the focal point position and aperture sizes of the projection optical system. This will be described below with reference to FIGS. 5A and 5B. FIGS. 5A and 5B are pattern diagrams of the projection optical system and projected image when the aperture size is A1 (FIG. 5A) and A2 (FIG. 5B). A1 and A2 meet A1>A2. In FIG. 5A, reference numeral 13 denotes a real image of the image display element 11. For the sake of simplicity, the projection optical system 12 is expressed by a single lens. The focal length of the projection optical system 12 is represented by Fp, and the distance between the image display element 11 and projection optical system 12 is represented by d. A distance di from the lens to an imaging plane Pf is derived by equation (7) obtained by modifying an imaging formula described by equation (6) below.

$$1/Fp = 1/d + 1/di \quad (6)$$

$$di = d \cdot Fp/(d - Fp) \quad (7)$$

On a plane P1 which is located in front of the imaging plane Pf by α, an image is spread. Letting A be an aperture size, this image spread B is described by:

$$B = \alpha \cdot A/di \quad (8)$$

As can be seen from the above equation, the image spread B, in other words, the defocus amount increases with increasing positional deviation amount α from the imaging position. For the sake of simplicity, the relationship to be geometric-optically calculated is described. However, although the image spread has to consider the influence of diffraction in wave-optical consideration, it is omitted in this case. That is, by evaluating the defocus amount of the projected pattern by the pattern projection unit 1, a distance from the reference plane 3 to an object can be estimated. On the other hand, as can be seen from equation (8), the defocus amount increases with increasing aperture size A. FIG. 5A shows an image spread B1 for the aperture size A1, and FIG. 5B shows an image spread B2 for the aperture size A2. In this case, B1>B2.

Since a defocus change with respect to a positional deviation becomes larger with increasing aperture size, the estimation precision of a distance improves. Since a variation caused by the positional deviation can no longer be calculated when the defocus amount exceeds a certain constant amount, a distance area in which the defocus amount can be estimated is limited. This distance area is broader with decreasing aperture size. Therefore, when a broader measurable distance area is to be set, the aperture size has to be decreased to some extent. However, when a broader distance area is set, since a defocus amount variation with respect to the positional deviation becomes smaller, the sensitivity lowers, and a detailed shape of an object cannot be measured.

Figure 6A:
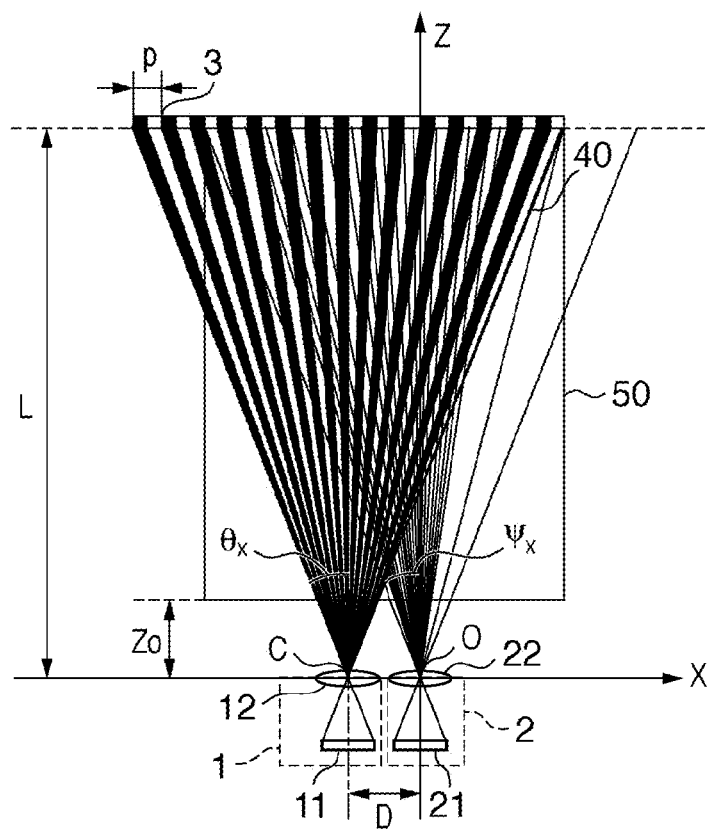
FIGS. 6A and 6B are views showing an example of the arrangement of the apparatus when calibration is performed.
Figure 6B:
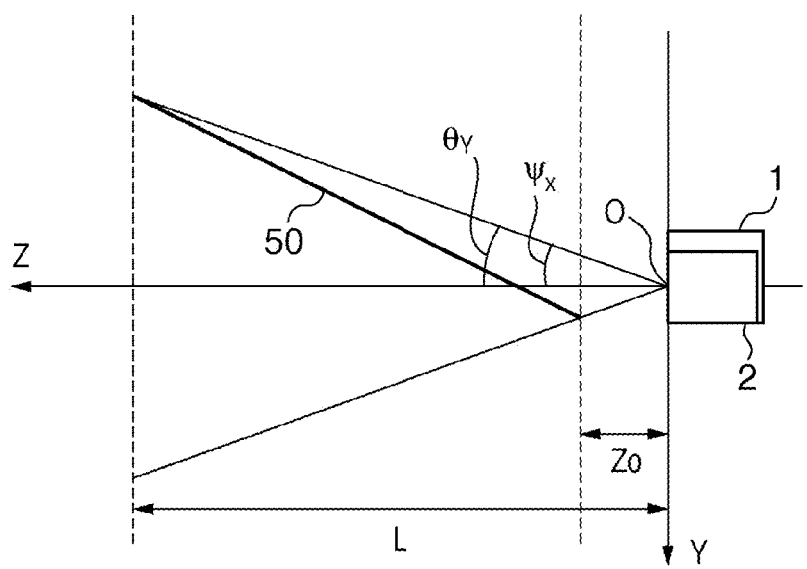
Figure 7:
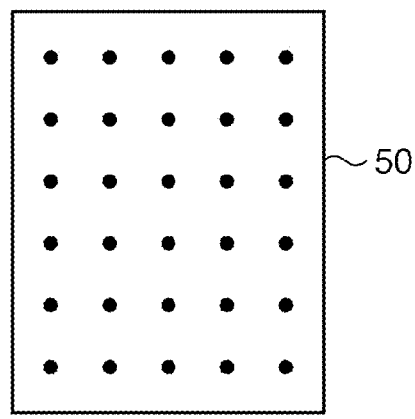
FIG. 7 is a view showing an example of a calibration board.

The shape measurement apparatus 100 of the first embodiment needs calibration required to acquire the relationship between the defocus amounts and depth positions prior to the shape measurement. A simple calibration method will be described below with reference to FIGS. 6A to 10. FIG. 6A is a schematic top view of an apparatus required to execute the calibration, and FIG. 6B is a schematic side view of the apparatus. The focal point of the pattern projection unit 1 is set on the reference plane 3 as in the arrangement shown in FIG. 1. Let Zo be a distance from the capturing unit 2 to a nearest point of a possible capturing area. A calibration board 50 is used for the calibration, and is made up of a flat board, as shown in FIG. 7. On the calibration board 50, dots are drawn at given intervals. Assume that the calibration board 50 is obliquely laid out, as shown in FIG. 6B, and the world coordinate values (X, Y, Z) of the respective dots are given. This is implemented using a known camera calibration method.

Figure 8:
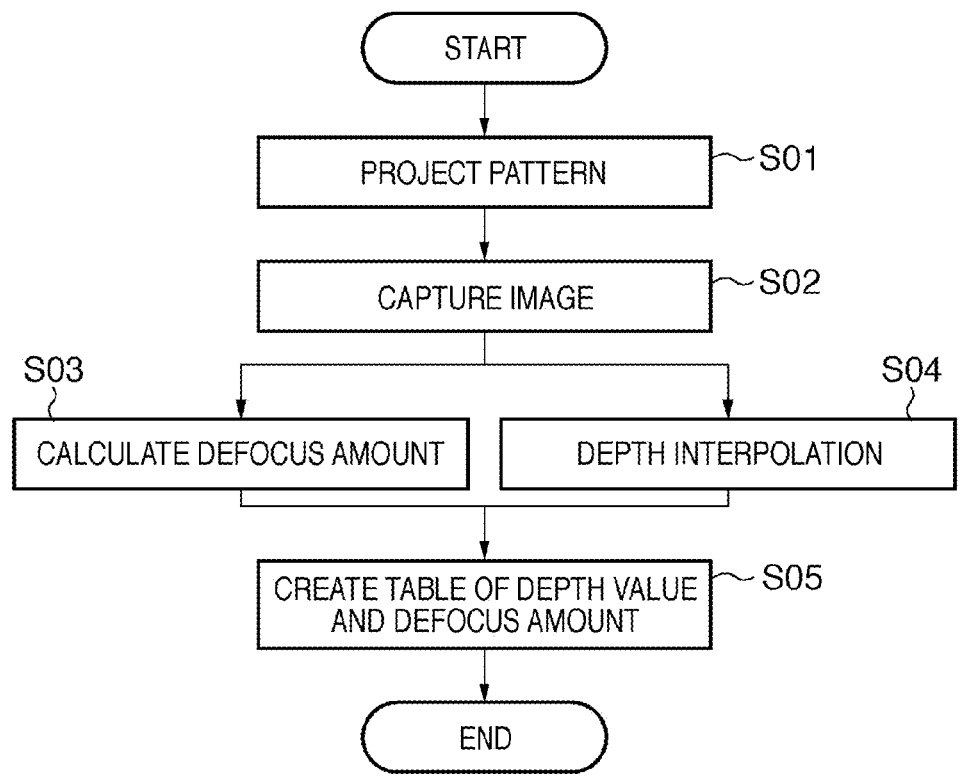
FIG. 8 is a flowchart showing an example of calibration processing.
Figure 9:
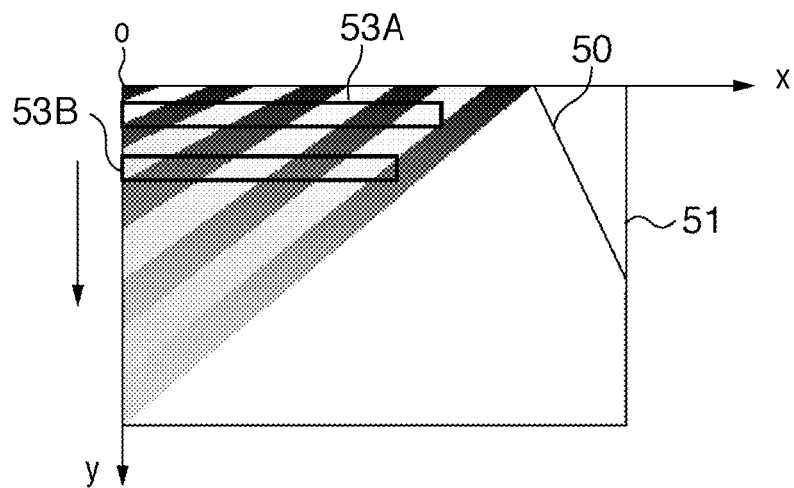
FIG. 9 is a view showing a capturing example of a pattern-projected calibration board.

The calibration processing in the shape measurement apparatus 100 will be described below with reference to FIG. 8. In step S01, the pattern projection unit 1 projects a pattern. More specifically, the pattern projection unit 1 projects the pattern, whose intensity changes sinusoidally, as shown in FIG. 2A, onto the calibration board 50. In step S02, the capturing unit 2 captures an image of the calibration board 50 on which the pattern is projected. At this time, for example, a captured image 51 shown in FIG. 9 is obtained. The image 51 includes the calibration board 50. FIG. 9 illustrates a small number of lines of the pattern for the sake of simplicity. However, the defocuses of the projected pattern become larger toward the lower portion of the image closer to the capturing unit 2. In step S03, a defocus amount calculation unit 8 calculates the defocus amounts of the projected pattern. The calculation of the defocus amounts uses contrast values or standard deviations.

A contrast value calculation method will be described first. Since the calibration board 50 is laid out, as shown in FIG. 6B, it is considered that depth values at an identical y-coordinate of the image are equal to each other. Hence, a region including patterns of a plurality of periods like a region 53A in the image 51 will be examined. The contrast C is calculated using equation (1) above from image luminance values in that region. In equation (1), $I_{max}$ is the maximum luminance in the image region, and $I_{min}$ is the minimum luminance in the image region. For example, calculations are made for all y-coordinates while shifting a region in the y-direction like the image region 53B. However, when the image region includes dots of the calibration board, that region is desirably excluded.

A standard deviation calculation method will be described below. As in the contrast values, a region including patterns of a plurality of periods like the region 53A will be examined. In case of the standard deviations, an SD value is calculated using equation (2) above in that region. Calculations are made for all y-coordinates while shifting this region in the y-direction.

Figure 10:
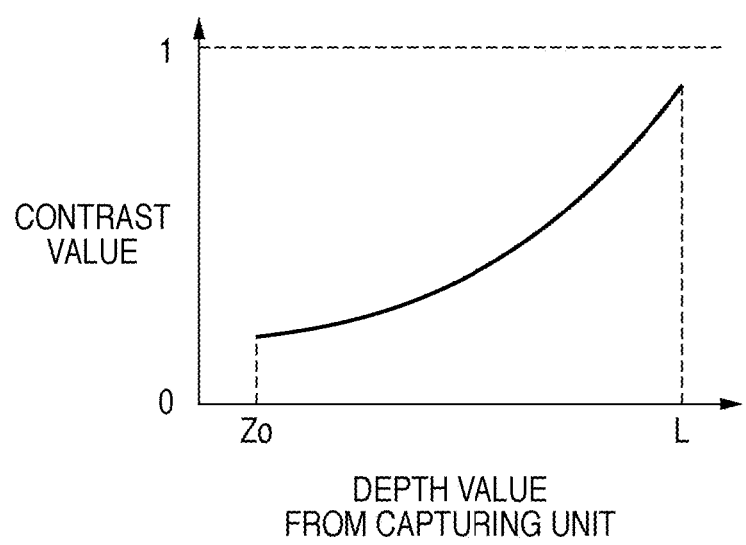
FIG. 10 is a graph showing a correspondence example of contrast values and depth values from a capturing unit 2.

Referring back to FIG. 8, depth interpolation processing is executed in step S04. More specifically, assuming that the calibration board 50 is a plane, depth values between neighboring dots are calculated by interpolation processing. If the calibration board 50 is an approximate plane, linear interpolation can be used in calculations. If the calibration board 50 has slight distortions, nonlinear interpolation is often preferred. In step S05, a table of the depth values and defocus amounts is created. More specifically, the corresponding relationship between the defocus amount calculated in step S03 and the depth values of the calibration board 50 calculated by the interpolation processing is calculated. For example, since the contrast value C of the captured image at a depth close to the reference plane 3 is high, and the contrast value of the captured image lowers with decreasing distance to the capturing unit 2, a curve shown in FIG. 10 is drawn. FIG. 10 shows a case using the contrast values as the defocus amounts. The curve may be calculated by functional approximation using, for example, a least square method.

This method is based on the assumption that the defocus of the entire image frame never varies. This assumption is established when the influence due to aberrations of a projector is small, and the defocus amount variation according to the position of the projected pattern is negligible. When the influence of a curvature of field is large, since defocus amounts at the central portion and peripheral portion of the projected image are different, strict calibration is often required. In order to attain strict calibration, the relationship between the defocus amount and depth value has to be calculated individually for each pixel of the image.

Figure 11:
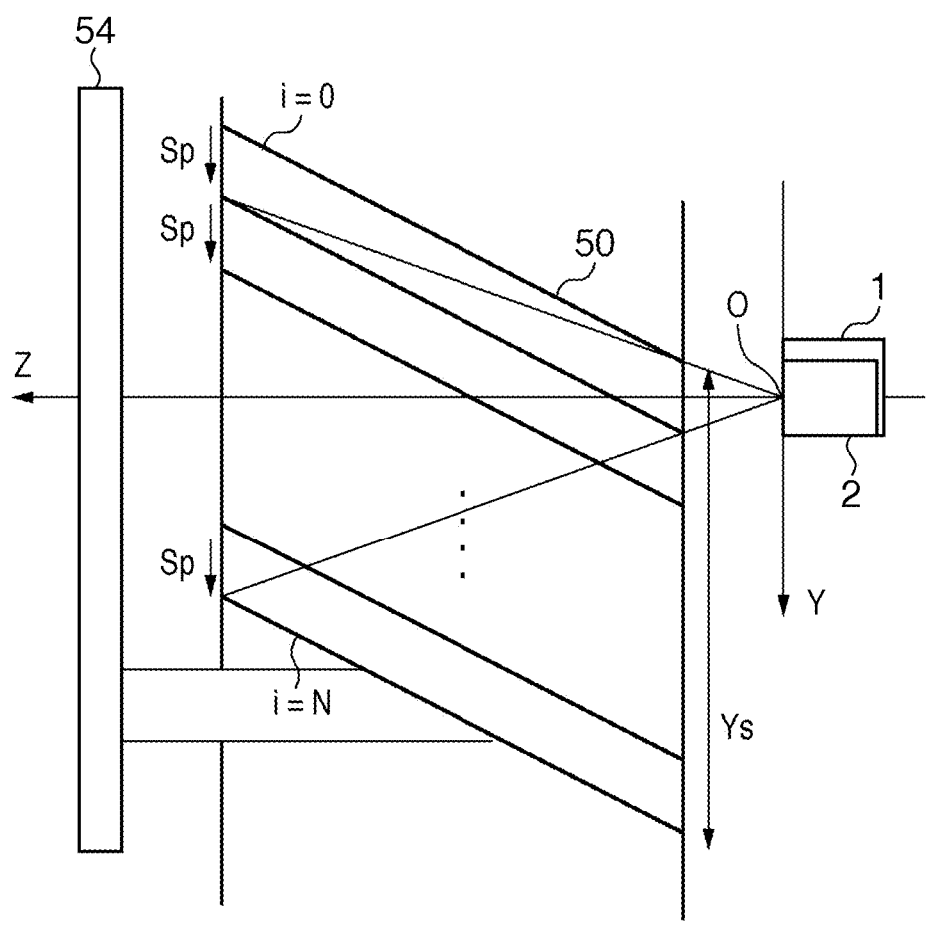
FIG. 11 is a view showing an example of the arrangement when detailed calibration is performed.

This will be described below with reference to FIG. 11. This method requires a calibration board moving unit 54 so as to move the calibration board 50 in the Y-axis direction, as shown in FIG. 11. Letting Ys be a width required to operate the calibration board 50, and N be the number of shift times, a shift pitch Sp is described by:

$$Sp=Ys/N \quad (9)$$

The calibration precision improves with decreasing shift pitch Sp of the calibration board 50. In the strict calibration processing in this case, additional processes are executed before and after the processing corresponding to the flowchart shown in FIG. 8. Before the pattern capturing process in step S01, the calibration board 50 is moved to an initial position. After that, steps S01 to S05 in FIG. 8 are executed. In case of the strict calibration, the number of times of capturing is counted, and every time the process in step S05 is completed, it is determined whether or not the number of times of capturing reaches the predetermined number N of times at which the calibration is to end. If the number of times of capturing does not reach the predetermined number N of times, the calibration board 50 is moved by the shift pitch Sp, and steps S01 to S05 are then repeated. If the number of times of capturing reaches the predetermined number N of times, the calibration ends. According to such processing, since the corresponding relationship between the defocus amounts and depth positions can be calculated for all pixels of the image, the calibration precision improves.

Figure 12:
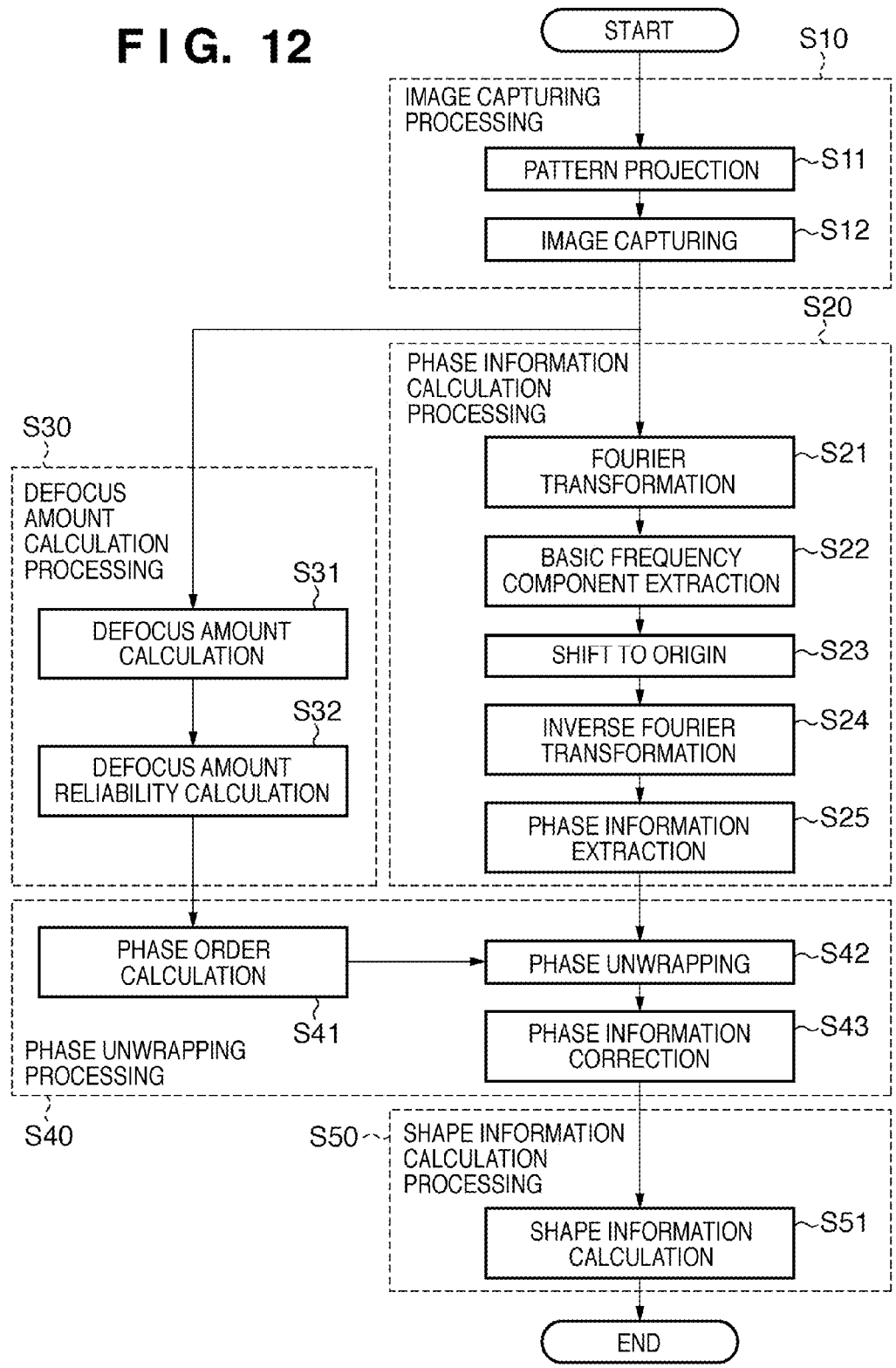
FIG. 12 is a flowchart showing an example of 3D shape measurement processing according to the first embodiment.

The shape measurement sequence by the shape measurement apparatus 100 of the first embodiment is described below. The shape measurement is executed along the flowchart shown in FIG. 12. The processing corresponding to that flowchart is implemented when the pattern projection unit 1, the capturing unit 2, a phase information calculation unit 7, the defocus amount calculation unit 8, and a 3D shape calculation unit 9 execute corresponding processing programs.

In step S10, image capturing processing including a pattern projection process (S11) and image capturing process (S12) is executed. In the pattern projection process in step S11, the pattern projection unit 1 projects a pattern onto a scene to be captured. In step S12, the capturing unit 2 captures an image of the scene to be captured. In step S20, the phase information calculation unit 7 executes phase information calculation processing including a Fourier transformation process (S21), basic frequency component extraction process (S22), shifting process to the origin (S23), inverse Fourier transformation process (S24), and phase information extraction process (S25).

Figure 13:
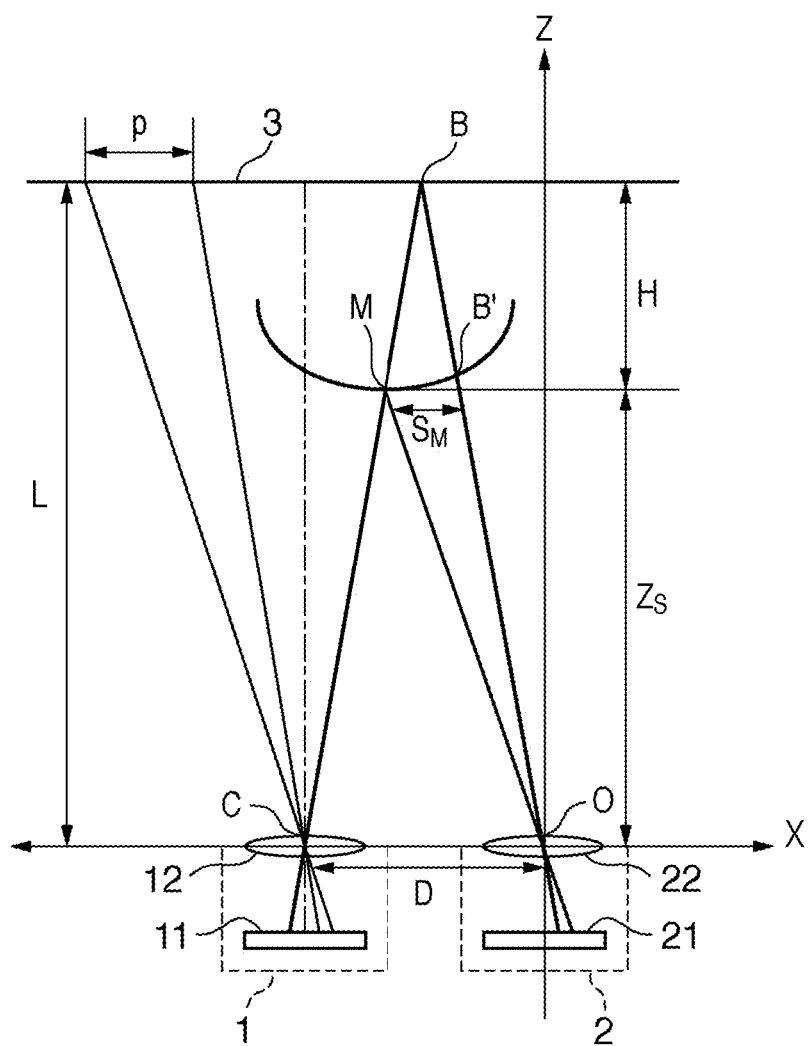
FIG. 13 is a view for explaining the principle of a Fourier transformation method.

Phase information of the first embodiment is calculated based on the Fourier transformation method. For this reason, the principle of the Fourier transformation method disclosed in non-patent reference 1 will be described below with reference to FIG. 13. FIG. 13 shows an optical layout when the pattern projection unit 1 and capturing unit 2 are parallel to each other. The reference plane 3 is located at a position separated by L from the optical center C of the pattern projection unit 1. Also, assume that an object plane M is located at a position separated by $Z_s$ from the optical center C of the pattern projection unit 1. Let H be a distance from the reference plane 3 to the object plane M. The projection unit projects a sinusoidal pattern, which periodically varies at the pitch p onto the reference plane. An image $g_B(x, y)$ observed on a capturing plane is expressed as a Fourier series, as given by:

$$g_B(x, y) = \sum_{n=1}^{\infty} A_n \exp(2\pi i n f_0 x) \quad (10)$$

where $f_0$ be a basic frequency of an observed fringe pattern, and is described by:

$$f_0 = 1/p \quad (11)$$

where p is the pitch of the pattern on the reference plane, and $A_n$ is a maximum amplitude of the intensity. When the scene includes an object, the phase of the observed fringe changes according to the distance from the reference plane to the object. For example, assume that there is a point which is projected at a position B on the reference plane, and is formed on an image plane. Assuming that the distance H from the reference plane separates an object, since it is projected on a point M, the object is observed in a state deviated by a distance $S_M$ on the image plane. Since this distance changes depending on x and y, equation (10) is corrected like:

$$g(x, y) = \sum_{n=1}^{\infty} A_n \exp\{2\pi i n f_0 (x + S(x, y))\} = \sum_{n=1}^{\infty} A_n \exp\{i(2\pi n f_0 x + n\phi(x, y))\} \quad (12)$$

for $\phi(x, y) = 2\pi f_0 S(x, y)$

Also, a variation of a reflectance $r(x, y)$ of the object surface has to be considered. Therefore, equation (12) is modified like:

$$g(x, y) = r(x, y) \sum_{n=1}^{\infty} A_n \exp\{i(2\pi n f_0 x + n\phi(x, y))\} \quad (13)$$

A distorted pattern image given by equation (13) can be interpreted as follows. That is, the pattern image is given by a multi-dimensional signal including a phase $\phi(x, y)$, amplitude $r(x, y)$, and spatial carrier frequency nfo. Since the phase includes 3D shape information, this is a question of how to calculate $\phi(x, y)$ by separating the non-uniform reflection amplitude $f(x, y)$. Equation (13) is rewritten as:

$$g(x, y) = \sum_{n=1}^{\infty} q_n(x, y) \cdot \exp(2\pi i n f_o x) \tag{14}$$

for $q_n(x, y) = A_n r(x, y) \cdot \exp^* in\phi((x, y))$

When an FFT algorithm computes a linear Fourier transform given by equation (14) while fixing y, we have:

$$G(f, y) = \int_{-\infty}^{\infty} g(x, y) \exp(-2\pi i f) dx = \sum_{n=-\infty}^{\infty} Q_n(f - nf_0, y) \tag{15}$$

where $G(f, y)$ and $Q_n(f, y)$ are respectively Fourier spectra associated with a variable x by fixing y in $g(x, y)$ and $q_n(x, y)$. In most cases, all spectra $Q_n(f-nf_0, y)$ are separated from each other by the basic frequency $f_0$.

Thus, a spectrum component $Q_1(f-nf_0, y)$ when n=1 is selected, and inverse Fourier transformation is executed to obtain a complex signal described by:

$$\hat{g}(x,y) = q_1(x,y) \cdot \exp(2\pi i f_0 x) = A_1 r(x,y) \cdot \exp\{i[2\pi f_0 x + \phi(x, y)]\} \tag{16}$$

From equation (10), a complex signal on the reference plane is given by:

$$\hat{g}_B(x,y) = q_1(x,y) \cdot \exp(2\pi i f_0 x) \tag{17}$$

Equations (16) and (17) give:

$$\hat{g}_B(x,y) \cdot \hat{g}_B^*(x,y) = |A_1|^2 r(x,y) \exp\{i[\phi(x,y)]\} \tag{18}$$

where * indicates a complex conjugate. Since $|A_1|^2 r(x, y)$ in equation (18) is a real function, a complex logarithm is calculated to yield:

$$\log[\hat{g}_B(x,y) \cdot \hat{g}_B^*(x,y)] = \log[|A_1|^2 r(x,y)] + i[\phi(x,y)] \tag{19}$$

With these arithmetic operations, the reflectance $r(x, y)$ of the object surface as an unnecessary component can be separated from the phase information $\phi(x, y)$ to be extracted.

A method of converting the extracted phase information into a height will be described below. From the relationship of a similarity between $\Delta BCO$ and $\Delta BMB'$ in FIG. 13, we have:

$$S_M = D \cdot H/(H+Z_s) \tag{20}$$

Substitution of equation (20) into $\phi(x, y) = 2\pi f_0 S(x, y)$ in equation (12) yields:

$$H = Z_s \phi(x,y) / (2\pi f_0 D - \phi(x,y)) \tag{21}$$

Note that the phase information that can be observed is $\phi_w(x, y)$ aliased to fall within a range from $-\pi$ to $+\pi$. Phase unwrapping has to be carried out using continuity of phases. This corresponds to decision of an order m in:

$$\phi(x,y) = 2\pi \cdot m + \phi_w(x,y) \tag{22}$$

Normal phase unwrapping is made under the assumption of shape continuity. However, in case of the scene including the plurality of objects, as shown in FIG. 1, since the object shapes are discontinuous, that assumption is not established, thus disturbing normal phase unwrapping. The principles of the phase information calculation by the Fourier transformation method and the depth measurement have been described.

The phase information calculation processing (S20) based on the aforementioned principle of the Fourier transformation method will be described below. In the Fourier transformation process in step S21, the captured image is Fourier-transformed for respective scan lines. In the basic frequency component extraction process in step S22, only data near the basic frequency $f_0$ in the frequency domain of those after the Fourier transformation are extracted by filtering. The basic frequency $f_0$ is calculated from the pitch p of the projected vertical fringe pattern on the reference plane using equation (11). In the shifting process to the origin in step S23, the extracted data near $f_0$ are shifted to the origin. The origin-shifted data near $f_0$ are inversely Fourier-transformed in step S24. In the phase information extraction process in step S25, phase information is extracted.

Figure 14:
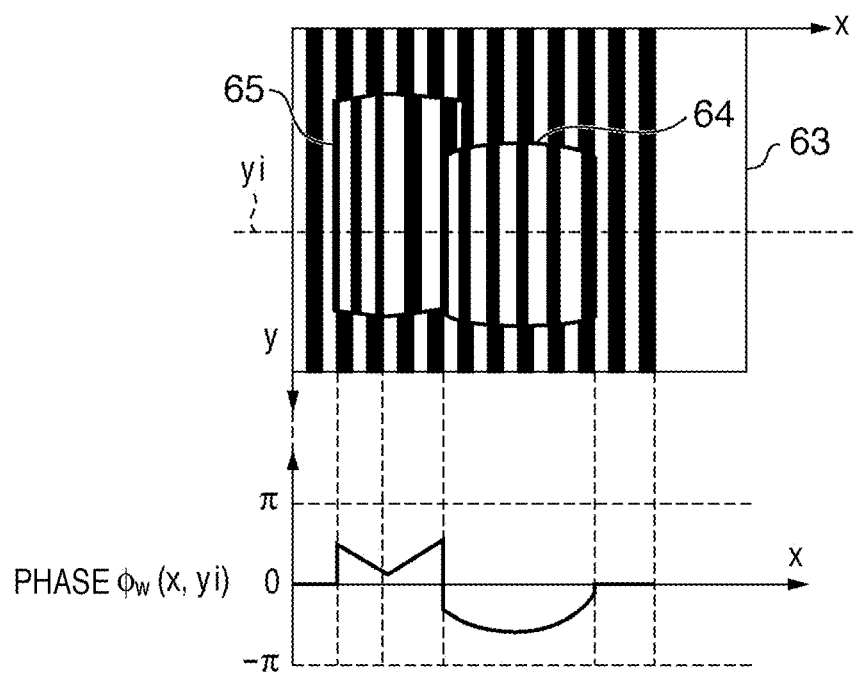
FIG. 14 is a view showing an example of the calculation result of aliased phases $\phi_w(x, y)$.

FIG. 14 shows an example of the calculation result of aliased phase information $\phi_w(x, yi)$ based on the pattern-projected captured image 63 shown in FIG. 4. A lower graph shows phase information from data on a scan line yi of the image. As can be seen from FIG. 14, detailed shape variations can be obtained from pieces of phase information of the circular cylinder 64 and rectangular column 65, but phases cannot be unwrapped since object positions are discontinuous.

In step S30, defocus amount calculation processing including a defocus amount calculation process (S31) and defocus amount reliability calculation process (S32) is executed. In the defocus amount calculation process in step S31, the defocus amount is calculated using the contrast value or standard deviation in a neighboring region of a pixel of interest.

Figure 15A:
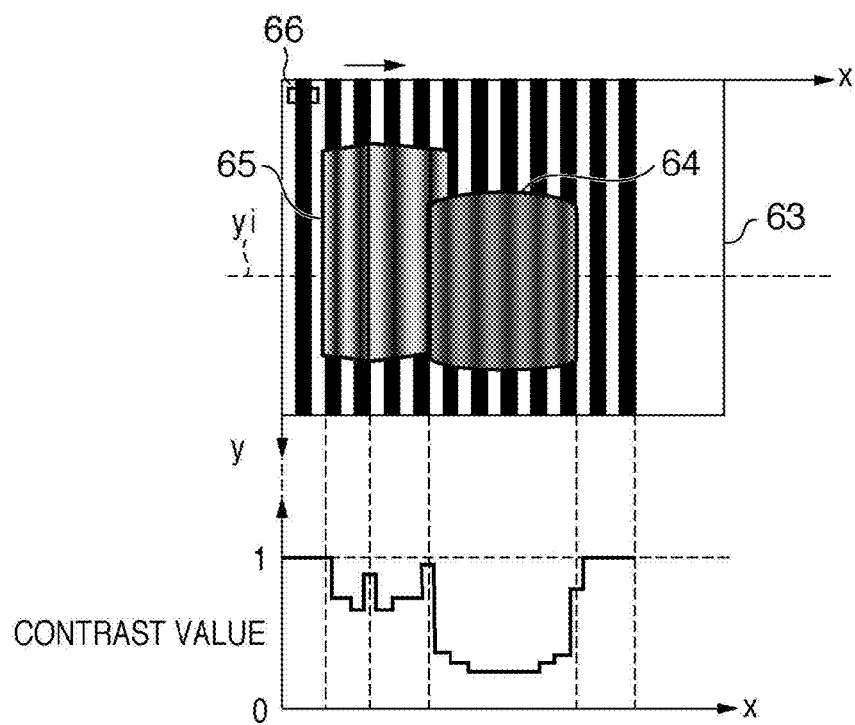
FIGS. 15A and 15B are views showing examples of the calculation results of contrast values and standard deviations.

FIG. 15A shows the calculation method and result in case of the contrast value. A region 66 in a predetermined area near the pixel of interest is an example of a calculation region of a contrast value. In this defocus amount calculation region, a contrast value is calculated using equation (1). The calculation region is raster-scanned to calculate contrast values in all regions of the image. However, the contrast calculation region is required to be an area broader than the projected pattern pitch p on the reference plane. If the above condition is not satisfied, since the region is unlikely to include luminance maximum and minimum values, a contrast cannot be normally evaluated. In FIG. 15A, a lower graph describes the contrast calculation result at a position of a y-coordinate yi of the image. On the reference plane as an in-focus region, since the pattern has an imaging relationship, the contrast is high. Since defocuses are generated on the rectangular column 65 located in front of the reference plane, and the circular column 64 located further in front of the reference plane, their contrast values are reduced. Since the circular column 64 located further in front of the reference plane has a larger defocus amount of the pattern, the contrast value is more reduced.

Figure 15B:
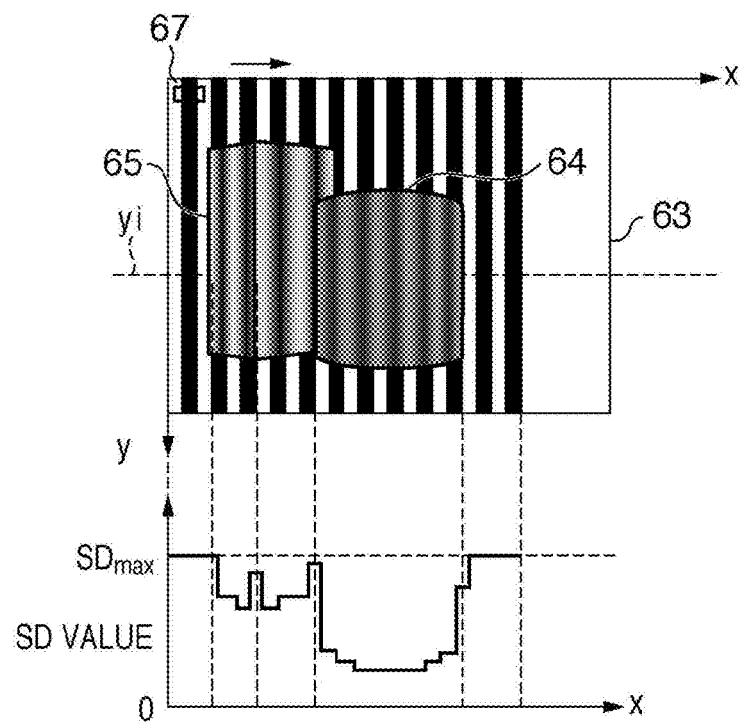

On the other hand, FIG. 15B shows the calculation method and result in case of a standard deviation. A region 67 in a predetermined area near a pixel of interest in FIG. 15B is a standard deviation calculation region. A standard deviation is calculated using equation (2) in this standard deviation calculation region. The calculation region is raster-scanned to calculate standard deviations in all the regions of the image. However, the standard deviation calculation region is required to be an area broader than the projected pattern pitch p on the reference plane. If the above condition is not satisfied, a luminance variation in the region is unlikely to be normally evaluated. In FIG. 15B, a lower graph describes the standard deviation calculation result. On the reference plane as an in-focus region, since the pattern has an imaging relationship, an image luminance variation becomes large, and the standard deviation is high. Since defocuses are generated on the rectangular column 65 located in front of the reference plane, and the circular column 64 located further in front of the reference plane, image luminance variations become small, and their standard deviation values are reduced. Since the circular column 64 located further in front of the reference plane has a larger defocus amount, the standard deviation is more reduced.

Even when either the contrast value or the standard deviation is used, the contrast value and standard deviation assume values higher than original values corresponding a depth at a boundary between objects or a portion where a direction of surface changes abruptly. There are three possible causes: the first cause is a reflectance difference caused by a difference in surface direction of an object; the second cause is a distance difference from the projection unit to the object; and the third cause is a distance difference from the object to the capturing unit 2.

The reflectance difference due to the difference in surface direction as the first cause will be described first. The surface becomes brighter as the incoming direction of light from the projection unit to the object and the direction of the capturing unit 2 are closer to a regular reflection angle. Conversely, the surface becomes darker as these directions are farther from the regular reflection directions. If the object surface is a perfectly diffusing surface, such phenomenon does not occur. However, on other surfaces, this phenomenon occurs. The distance difference from the projection unit to the object will be described below. The intensity of light coming from the projection unit attenuates in proportion to a distance. For this reason, since the incoming light intensity is higher with decreasing distance from the projection unit to the object, the object surface becomes brighter. Conversely, since the incoming light intensity is lower with increasing distance from the projection unit to the object, the object surface becomes darker.

The distance difference from the object to the capturing unit 2 will be described below. The reflected light intensity from the object also attenuates in proportion to a distance. The object surface becomes brighter with decreasing distance from the object to the capturing unit 2. On the other hand, the object surface becomes darker with increasing distance from the object to the capturing unit 2.

In an actual scene, these three phenomena occur in combination. Such portion may have a low reliability of the defocus amount calculation result. Hence, in the defocus amount reliability calculation process in step S32, a reliability is evaluated.

A defocus amount reliability P(x, y) is calculated using:

$$P(x,y)=Df(x,y)-Df(x-1,y) \qquad (23)$$

Df(x, y) stores a defocus amount at x=x and y=y. Equation (23) above corresponds to a calculation of difference (derivative) of defocus values. That is, the absolute value of P(x, y) becomes large for a portion with a large variation of the defocus values. When the absolute value of P(x, y) is equal to or smaller than a predetermined threshold, a high reliability is determined, and the defocus amount is used intact. On the other hand, when the absolute value is larger than the threshold, a low reliability is determined, and correction processing is executed. In the following description, this threshold is expressed by Pt, which is used as a reference upon evaluating the reliability. The correction processing is executed in a phase information correction process (S43) in phase unwrapping processing in step S40. Details will be described later.

FIGS. 16B and 16C show graphs of the calculation result of the defocus value Df and that of the defocus reliability P(x, y) in the image 63 of FIG. 16A. In a region where a variation of the defocus values is large, the absolute value of the defocus reliability becomes larger, thus lowering the reliability of the defocus values.

In step S40, the 3D shape calculation unit 9 executes phase unwrapping processing including a phase order calculation process (S41), phase unwrapping process (S42), and phase information correction process (S43). In the phase order calculation process in step S41, the defocus amount Df(x, y) is converted into a depth value Z(x, y) based on the calibration result executed in advance. A phase φ(x, y) is calculated from the depth value Z(x, y) using equation (24) below obtained by modifying equation (22) (using a relation Z=L−H).

$$\phi(x,y)=2\pi f_0 D(1-Z(x,y)/L) \qquad (24)$$

From the calculated φ(x, y), an order m is calculated using:

$$m=\text{Int}[\phi(x,y)/2\pi] \qquad (25)$$

where Int[ ] means to truncate fractions after the decimal point. FIG. 16D shows a graph of the calculated order m. In a region where the defocus value reliability is lower than a reference, the phase order calculation is skipped. Such region is a hatched region in the graph. In the phase unwrapping process in step S42, phases are unwrapped based on the calculated phase orders m and the phase information extraction results in step S25. More specifically, equation (26) below is used.

$$\phi_m(x,y)=2\pi \cdot m + \phi_w(x,y) \qquad (26)$$

Equation (26) has the same form as equation (22), but it is different from original φ(x, y) since the region where the defocus value reliability is lower than the reference is included. In order to distinguish these phases, a phase when the region where the defocus value reliability is lower than the reference is included is described as $\phi_m(x, y)$.

FIG. 16E shows a graph of the $\phi_m(x, y)$ calculation result. The region where the defocus value reliability is lower than the reference is indicated by hatching. In the phase information correction process in step S43, original φ(x, y) is calculated by correcting information in which the region where the defocus value reliability is lower than the reference is omitted of $\phi_m(x, y)$. The omitted information is corrected using continuity of phases $\phi_w$ before unwrapping. Note that FIG. 16F shows a graph showing the phases by reflecting the orders m to FIG. 16E.

Figure 17A:
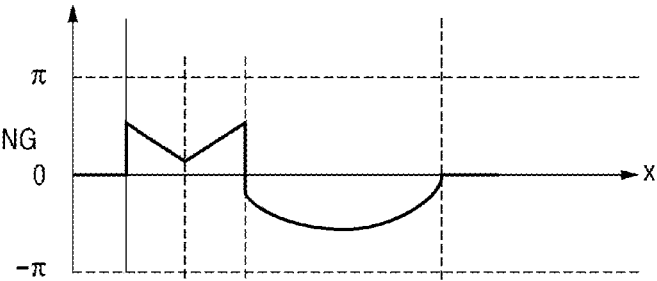
FIGS. 17A to 17E are views for explaining a correction method of phase information.
Figure 17B:
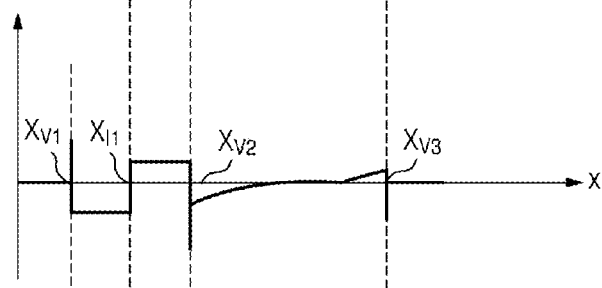
Figure 17C:
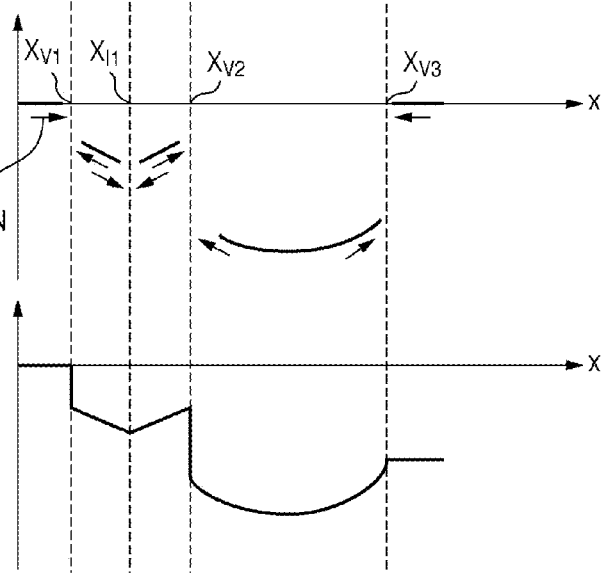

The correction method will be described in detail below with reference to FIGS. 17A to 17E. FIG. 17A is a graph showing phases before unwrapping in correspondence with FIG. 16E. FIG. 17B is a graph of $d\phi_w(x, yi)/dx$ as derivative values (difference values) of the phases $\phi_w(x, yi)$. At positions $x=x_{V1}$, $x_{V2}$, and $x_{V3}$ where the absolute values of the derivative values of the phases are large, phase discontinuity occurs. At a position $x=x_{f1}$ where the signs of the derivative values of the phases are inverted, a surface slope changes. These points will be referred to as specific points of phase changes.

Figure 17D:
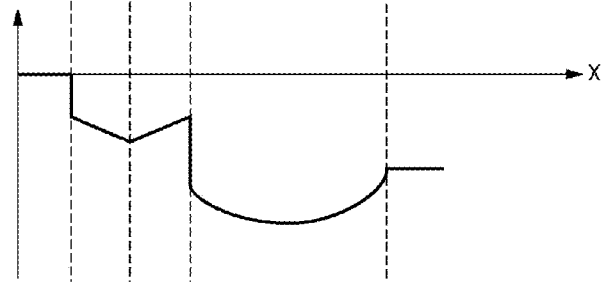

In a region with a small phase change other than the specific points, since no phase discontinuity occurs, shape continuity is guaranteed. Therefore, the region where $\phi_m(x, yi)$ is omitted can be corrected using the continuity of the phases $\phi_w(x, yi)$. A graph of $\phi_m(x, yi)$ in FIG. 17C includes blanks since graphs of the regions where the defocus value reliability is lower than the reference are not drawn. In such case, such region is corrected from the vicinity of a blank toward a specific point using $\phi_w$ continuity. More specifically, this operation is continued until the specific point is crossed in a direction of each arrow in FIG. 17C. FIG. 17D shows corrected phases φ(x, yi).

Finally, in shape calculation processing in step S50, the 3D shape calculation unit 9 calculates a shape. The shape calculation processing includes a shape information calculation process (S51). The shape information calculation process in step S51 converts phase information φ(x, y) into depth information Z(x, y) based on equation (27) below obtained by modifying equation (24).

$$Z(x,y)=L(1-\phi(x,y)/(2\pi f_0 D)) \quad (27)$$

Figure 17E:
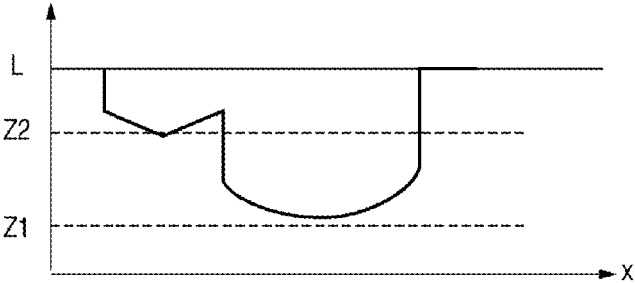
Figure 19A:
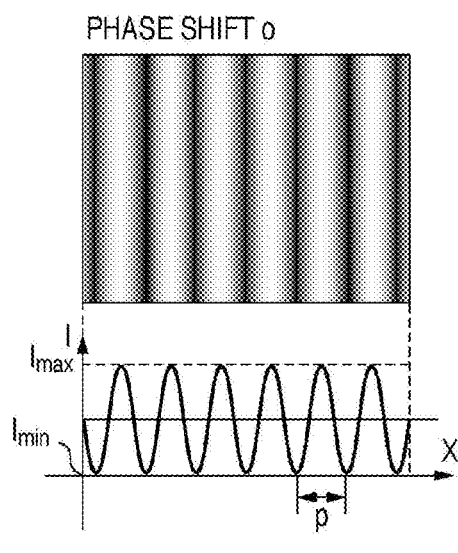
FIGS. 19A to 19D are views showing projected pattern examples of a pattern projection unit 1 of the second embodiment.
Figure 19B:
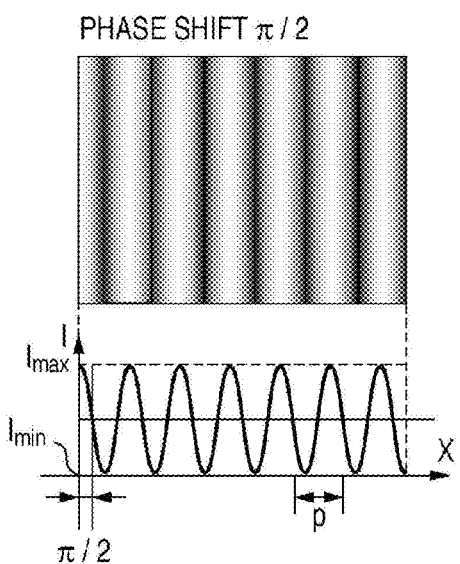
Figure 19C:
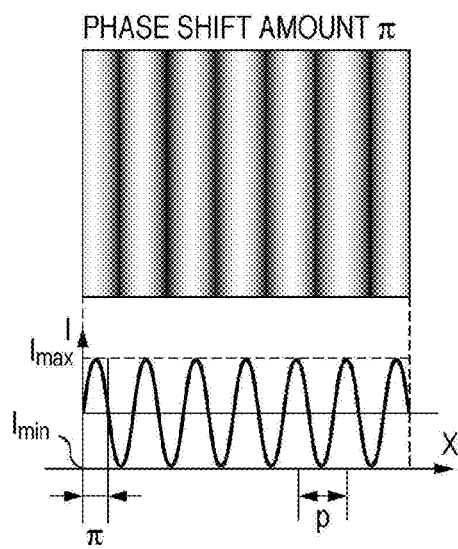
Figure 19D:
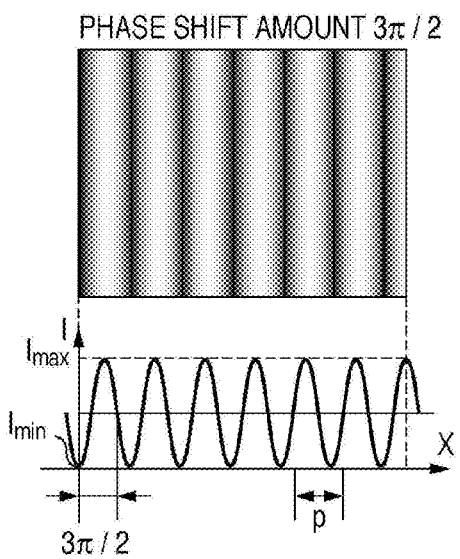

FIG. 17E shows the finally calculated shape information. As can be seen from FIG. 17E, even for an object located at a discontinuous depth, a detailed shape measurement can be done by projecting a pattern only once. As described above, in this embodiment, the shape information can be calculated.

Second Embodiment

FIG. 18 is a schematic view of a shape measurement apparatus 200 according to the second embodiment of the present invention. In the arrangement shown in FIG. 18, a projection pattern switching unit 14 is added to that of the first embodiment shown in FIG. 1. The second embodiment uses a phase shift method to acquire phase information. In the phase shift method, three or more different patterns are required to be projected while shifting the phase of a sinusoidal pattern shown in FIG. 2A. In the second embodiment, four different patterns are projected while shifting the phase of the sinusoidal pattern by π/2.

Examples of these four different patterns are as shown in FIGS. 19A to 19D. FIGS. 19A to 19D respectively show cases of the phase shift amounts=0, π/2, π, and 3π/2. By projecting these four different patterns having different phases, an effect of allowing acquisition of phase information insusceptible to a texture of an object can be obtained. Furthermore, a defocus amount calculation in a defocus amount calculation unit 8 allows to calculate a defocus amount with high reliability. However, since four different patterns are to be projected, an object is likely to move during image capturing processes while switching the patterns. Therefore, in order to cope with an object which moves quickly, a projection unit which can switch patterns at high speed, and a capturing unit 2 having a high frame rate are required.

As the projection unit which can switch patterns at high speed, a projector using a DMD as a display element, a projector using a quick response liquid crystal display element, and the like may be used. As the capturing unit 2 having a high frame rate, a commercially available high-speed camera can be used. Using the high-speed camera, images can be acquired at 100 fps or 1000 fps. As in the Fourier transformation method, since phases that can be observed range from 0 to 2π, when a phase change exceeding it occurs, phase unwrapping is required. Since calibration processing to be executed in advance performs the same operations as in the shape measurement apparatus 100 of the first embodiment, a description thereof will not be repeated. Assume that the relationship between the defocus amounts and depth positions is already acquired by the calibration.

The shape measurement sequence by the shape measurement apparatus 200 of the second embodiment will be described below. The shape measurement is executed along the flowchart shown in FIG. 20. The processing corresponding to that flowchart is implemented when a pattern projection unit 1, the capturing unit 2, a phase information calculation unit 7, the defocus amount calculation unit 8, a 3D shape calculation unit 9, and the projection pattern switching unit 14 execute corresponding processing programs.

Image capturing processing in step S10' includes a pattern projection process (S11), an image capturing process (S12), a determination process of the number of captured images (S13), and a pattern phase π/2 shifting process (S14). The image capturing processing in step S10' is different from that of the first embodiment in that the determination process of the number of captured images in step S13 and the pattern phase π/2 shifting process in step S14 are added.

In step S11, the projection unit 1 projects a reference phase pattern. In the image capturing process in step S12, the capturing unit 2 captures an image of a scene to be captured. It is determined in step S13 if the number of captured images is less than four. If the number of captured images is four or more, the process advances to next phase information calculation processing (S20') and defocus amount calculation processing (S30'). If the number of captured images is less than four, the process advances to step S14. In step S14, the pattern phase is shifted by π/2 using the projection pattern switching unit 14. After that, the pattern projection process in step S11 and the image capturing process in step S12 are executed. In this way, in the image capturing processing in step S10', four images in which the phases of the projected patterns are different by π/2 are obtained.

Figure 21:
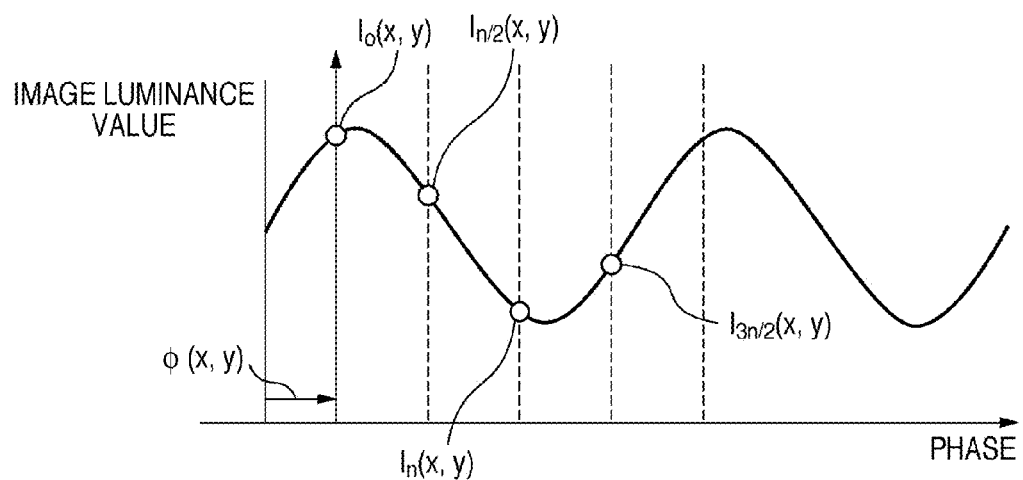
FIG. 21 is a view for explaining the principle of phase calculations by a phase shift method.

Phase information calculation processing in step S20' to be executed next includes a phase information calculation process (S26) based on phase-shifted images. The process to be executed in step S26 will be described below with reference to FIG. 21. FIG. 21 is a graph in which the abscissa plots a phase and the ordinate plots an image luminance value. From captured images having phase shift amounts=0, π/2, π, and 3π/2, luminance values of pixels at identical coordinate positions (x, y) are extracted, and are plotted at the corresponding positions. Let $I_0(x, y)$, $I_{\pi/2}(x, y)$, $I_\pi(x, y)$, and $I_{3\pi/2}(x, y)$ respectively be luminance values when the image coordinates=(x, y) and the phase shift amounts=0, π/2, π, and 3π/2. At this time, phase information $\phi_w(x, y)$ at the position of the image coordinates (x, y) can be calculated using:

$$\phi_w(x,y)=\tan^{-1}\{I_{3\pi/2}(x,y)-I_{\pi/2}(x,y)\}/\{I_0(x,y)-I_\pi(x,y)\} \quad (28)$$

In the Fourier transformation method, since the processing is complete by only a luminance variation according to a change in projected pattern of a pixel of interest, the phase calculation robust against a variation of an object texture can be performed.

In step S30', the defocus amount calculation unit 8 executes defocus amount calculation processing including a defocus amount calculation process (S31), a defocus amount reliability calculation process (S32), a determination process of the number of processed image (S33), an image change process (S34), and a result integration process (S35). Since the defocus amount calculation process in step S31 uses a contrast value or standard deviation in a neighboring region of a pixel of interest to calculate a defocus amount as in the first embodiment, a description thereof will not be given. Also, since the defocus amount reliability calculation process in step S32 calculates a difference (derivative) of defocus amounts as in the first embodiment, a description thereof will not be given.

The determination process of the number of processed images in step S33 determines whether or not the number of processed images is less than four. If the number of processed images is four or more, the process advances to the result integration process in step S35. If the number of processed images is less than four, the process advances to the image change process in step S34. In step S34, an object to be processed is changed to a captured image of a projected pattern to which no defocus amount calculation processing is applied. In step S35, the defocus amount calculation results and the defocus reliability calculation results obtained for different projected patterns are integrated.

In this embodiment, an image having a phase shift amount=0 is used as an initial image, and a region where a defocus reliability is lower than a reference is extracted. When the defocus reliability of this region is equal to or higher than the reference in an image having a different phase shift amount, a defocus value at that time is overwritten on the result of the initial image. This operation is repeated for images having different phase shift amounts to integrate defocus amounts whose defocus reliabilities are equal to or higher than the reference, thereby reducing a region where the defocus reliability is lower than the reference. By integrating the results of captured images of a plurality of patterns, data of a region with a high defocus reliability can be selected, thus allowing high-precision defocus amount calculations. Note that phase unwrapping processing in step S40 and phase information calculation processing in step S50 perform the same operations as those in the first embodiment, and a description thereof will not be repeated.

The second embodiment described above allows the phase calculations robust against texture variations and the defocus amount calculations with high reliability, although the number of captured images is increased to four.

The 3D shape measurement apparatus according to the present invention can be used in various applications. In the field of CG or the like, the 3D shape measurement apparatus can attain modeling of an existing object. Thus, modeling which is manually made in a conventional apparatus can be automated, thus expecting to enhance efficiency of CG production. Since the distance calculations with high precision can be attained using a small number of patterns, the 3D shape measurement apparatus can be used as a vision for a robot hand which requires a quick response. Since the shape measurement using a relatively small number of patterns can be attained, it can be applied even to a moving object. When the 3D shape measurement apparatus is combined with a compact projector, it can be mounted on a compact capturing device such as a digital camera, and can be used as input information required for advanced processing using a 3D shape.

The present invention allows computer programs to implement the processing equivalent to the first and second embodiments. In this case, the components such as blocks 7 to 9 and 14 in FIGS. 1 and 18 can function in the form of functions or subroutines executed by a CPU. Normally, computer programs are stored in a computer-readable storage medium such as a CD-ROM, and can be executed when the storage medium is set in a reader (CD-ROM drive, etc.) included in a computer to copy or install the computer programs in a system. Therefore, it is obvious that such computer-readable storage medium is included in the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123536, filed May 21, 2009, which is hereby incorporated by reference herein in its entirety.

What is claimed is:

1. A three dimensional shape measurement apparatus for measuring a 3D shape of an object existing on a measurement area, comprising:
    a pattern projection unit configured to project a pattern having a periodicity onto the measurement area; and
    a capturing unit configured to capture an image of the area onto which the pattern is projected,
    wherein the measurement area is specified by a reference plane, a projection area of the pattern projection unit, and a capturing area of the capturing unit, and the pattern projection unit projects the pattern to be focused on the reference plane,
    the apparatus further comprising:
    a phase information calculation unit configured to calculate phase information of a pattern of an image captured by the capturing unit when the object exists on the measurement area;
    a defocus amount calculation unit configured to calculate defocus amounts of the pattern in the captured image; and
    a three dimensional shape calculation unit configured to calculate a three dimensional shape of the object based on the phase information and the defocus amounts, and
    wherein the three dimensional shape calculation unit comprises a phase information correction unit configured to correct the phase information, and
    the phase information correction unit further configured to convert the defocus amounts into depth information of the measurement area from the capturing unit toward the reference plane, to calculate orders of phases corresponding to the depth information, and to correct the phase information based on the orders, and
    the three dimensional shape calculation unit further configured to calculate the three dimensional shape of the object based on the corrected phase information.

2. The apparatus according to claim 1, wherein the defocus amount calculation unit further configured to calculate variations of the defocus amounts, and to exclude a defocus amount whose variation is higher than a threshold, and
    the phase information correction unit further configured to convert the depth amounts whose variations are not more than the threshold into the depth information.

3. The apparatus according to claim 1, wherein the pattern to be projected by the pattern projection unit includes not less than three types of projection patterns having different phase shift amounts,
    the capturing unit further configured to respectively capture the not less than three types of projection patterns, and
    the phase information calculation unit further configured to acquire luminance values at identical coordinate positions from captured images obtained for the not less than three types of projection patterns, and to calculate the phase information based on a relationship between the acquired luminance values and phase shift amounts corresponding to the luminance values.

4. The apparatus according to claim 3, wherein the defocus amount calculation unit further configured to calculate variations of the defocus amounts from captured images obtained for the not less than three types of projection patterns, and to integrate defocus amounts whose variations are not more than a threshold, and the phase information correction unit further configured to convert the integrated defocus amounts into the depth information.

5. The apparatus according to claim 1, wherein the defocus amount calculation unit further configured to calculate the defocus amounts based on contrast values within a predetermined area near a pixel of interest of the captured image.

6. The apparatus according to claim 1, wherein the defocus amount calculation unit further configured to calculate the defocus amounts based on standard deviations within a predetermined area near a pixel of interest of the captured image.

7. A three dimensional shape measurement apparatus for measuring a 3D shape of an object existing on a measurement area, comprising:

a pattern projection unit configured to project a pattern having a periodicity onto the measurement area; and a capturing unit configured to capture an image of the area onto which the pattern is projected, wherein the measurement area is specified by a reference plane, a projection area of the pattern projection unit, and a capturing area of the capturing unit, and the pattern projection unit projects the pattern to be focused on the reference plane, the apparatus further comprising:

a phase information calculation unit configured to calculate phase information of a pattern of an image captured by the capturing unit when the object exists on the measurement area;

a defocus amount calculation unit configured to calculate defocus amounts of the pattern in the captured image; and a three dimensional shape calculation unit configured to calculate a three dimensional shape of the object based on the phase information and the defocus amounts, wherein the number of types of patterns to be projected by the pattern projection unit is one, and the phase information calculation unit further configured to calculate the phase information by Fourier-transforming the captured image for respective scan lines, extracting data near a basic frequency of the pattern from the Fourier-transformed data, and inversely Fourier-transforming the extracted data.

8. A three dimensional shape measurement method using a three dimensional shape measurement apparatus for measuring a three dimensional shape of an object existing on a measurement area, the apparatus comprising:

a pattern projection unit configured to project a pattern having a periodicity onto the measurement area; and a capturing unit configured to capture an image of the area onto which the pattern is projected, wherein the measurement area is specified by a reference plane, a projection area of the pattern projection unit, and a capturing area of the capturing unit, and the method comprising steps of:

projecting the pattern to be focused on the reference plane;

calculating phase information of a pattern of a captured image captured by the capturing unit when the object exists on the measurement area;

calculating defocus amounts of the pattern in the captured image; and calculating a three dimensional shape of the object based on the phase information and the defocus amounts, wherein said step of calculating the three dimensional shape includes correcting the phase information, said step of calculating phase information includes converting the defocus amounts into depth information of the measurement area from the capturing unit toward the reference plane, calculating orders of phases corresponding to the depth information, and correcting the phase information based on the orders, and said step of calculating a three dimensional shape includes calculating the three dimensional shape of the object based on the corrected phase information.

9. A computer program stored in a computer readable storage medium which causes a computer to execute a three dimensional shape measurement method using a three dimensional shape measurement apparatus for measuring a three dimensional shape of an object existing on a measurement area, the apparatus comprising:

a pattern projection unit configured to project a pattern having a periodicity onto the measurement area; and a capturing unit configured to capture an image of the area onto which the pattern is projected, wherein the measurement area is specified by a reference plane, a projection area of the pattern projection unit, and a capturing area of the capturing unit, and the method comprising steps of:

projecting the pattern to be focused on the reference plane;

calculating phase information of a pattern of a captured image captured by the capturing unit when the object exists on the measurement area;

calculating defocus amounts of the pattern in the captured image; and calculating a three dimensional shape of the object based on the phase information and the defocus amounts, wherein said step of calculating the three dimensional shape includes correcting the phase information, said step of calculating phase information includes converting the defocus amounts into depth information of the measurement area from the capturing unit toward the reference plane, calculating orders of phases corresponding to the depth information, and correcting the phase information based on the orders, and said step of calculating a three dimensional shape includes calculating the three dimensional shape of the object based on the corrected phase information.

* * * * *